United States Patent
Zhao

(10) Patent No.: US 10,980,072 B2
(45) Date of Patent: Apr. 13, 2021

(54) METHOD AND DEVICE FOR PERFORMING COMMUNICATION CONFIGURATION

(71) Applicant: China Academy of Telecommunications Technology, Beijing (CN)

(72) Inventor: Yali Zhao, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 16/089,321

(22) PCT Filed: Mar. 21, 2017

(86) PCT No.: PCT/CN2017/077514
§ 371 (c)(1),
(2) Date: Sep. 27, 2018

(87) PCT Pub. No.: WO2017/167073
PCT Pub. Date: Oct. 5, 2017

(65) Prior Publication Data
US 2019/0116626 A1   Apr. 18, 2019

(30) Foreign Application Priority Data
Mar. 28, 2016 (CN) .......................... 201610184723.0

(51) Int. Cl.
*H04W 76/14* (2018.01)
*H04W 72/04* (2009.01)
(Continued)

(52) U.S. Cl.
CPC ............. *H04W 76/14* (2018.02); *H04W 4/00* (2013.01); *H04W 8/005* (2013.01);
(Continued)

(58) Field of Classification Search
None
See application file for complete search history.

(56) References Cited

U.S. PATENT DOCUMENTS 10,070,455 B2 * 9/2018 Lee .................. H04W 72/1215
2011/0106952 A1 * 5/2011 Doppler ............ H04W 72/0406
709/226
(Continued)

FOREIGN PATENT DOCUMENTS

CA       2929354 A1    5/2015
CN    103327568 A     9/2013
(Continued)

OTHER PUBLICATIONS

ETRI. "Discussion on resource allocation for D2D discovery" 3GPP TSG RAN WG1 Meeting #75 R1-135279, Nov. 15, 2013.

*Primary Examiner* — Phirin Sam
*Assistant Examiner* — Faiyazkhan Ghafoerkhan
(74) *Attorney, Agent, or Firm* — Foley & Lardner LLP

(57) ABSTRACT

A method and device for performing communication configuration for solving the problem in the prior art that the power consumption is very large, due to the fact that a D2D receiving UE needs to continuously monitor a system broadcast or continuously monitor a pre-configured D2D receiving resource. According to the embodiments of the present invention, a first terminal determines a target communication period according to configuration information for determining the target communication period; a first network side device determines the configuration information for determining the target communication period, wherein the target communication period is a period during which direct communication interface transmitting and/or receiving can be performed through a direct communication interface; and the configuration information is transmitted to a second terminal, so that a terminal performing direct communica- (Continued)

tion determines the target communication period according to the configuration information.

19 Claims, 9 Drawing Sheets

(51) Int. Cl.
*H04W 8/00* (2009.01)
*H04W 4/00* (2018.01)
*H04W 76/28* (2018.01)

(52) U.S. Cl.
CPC ........ *H04W 72/0446* (2013.01); *H04W 76/28* (2018.02); *Y02D 30/70* (2020.08)

(56) References Cited

U.S. PATENT DOCUMENTS

| | | | | |
|---|---|---|---|---|
| 2013/0322413 | A1* | 12/2013 | Pelletier | H04L 5/0091 370/336 |
| 2014/0213250 | A1* | 7/2014 | Baek | H04W 8/005 455/434 |
| 2014/0235248 | A1* | 8/2014 | Chai | H04W 76/14 455/436 |
| 2015/0055532 | A1* | 2/2015 | Lu | H04W 52/0225 370/311 |
| 2015/0195863 | A1* | 7/2015 | Reznik | H04W 28/0215 370/228 |
| 2015/0208452 | A1* | 7/2015 | Lee | H04W 76/27 455/426.1 |
| 2015/0215767 | A1* | 7/2015 | Siomina | H04W 76/14 455/435.2 |
| 2015/0215982 | A1* | 7/2015 | Siomina | H04W 76/14 370/252 |
| 2015/0271656 | A1* | 9/2015 | Sachs | H04W 48/08 370/329 |
| 2015/0271859 | A1* | 9/2015 | Huang | H04W 24/10 370/329 |
| 2015/0282132 | A1* | 10/2015 | Kim | H04W 4/08 370/329 |
| 2015/0296535 | A1* | 10/2015 | Lee | H04W 8/24 370/329 |
| 2015/0319746 | A1* | 11/2015 | Lu | H04L 1/1854 370/280 |
| 2016/0366645 | A1* | 12/2016 | Song | H04W 52/0229 |
| 2017/0041875 | A1* | 2/2017 | Lu | H04W 76/23 |
| 2017/0070986 | A1* | 3/2017 | Lee | H04W 8/24 |
| 2017/0196036 | A1* | 7/2017 | Lee | H04W 76/18 |
| 2017/0339689 | A1* | 11/2017 | Lee | H04W 8/14 |
| 2018/0199330 | A1* | 7/2018 | Lee | H04W 72/14 |
| 2019/0191452 | A1* | 6/2019 | Pelletier | H04W 72/0406 |
| 2019/0261348 | A1* | 8/2019 | Lee | H04W 60/04 |

FOREIGN PATENT DOCUMENTS

| | | |
|---|---|---|
| CN | 103581093 A | 2/2014 |
| WO | WO-2014/092612 A1 | 6/2014 |
| WO | WO 2015/152581 A1 | 10/2015 |

* cited by examiner

METHOD AND DEVICE FOR PERFORMING COMMUNICATION CONFIGURATION

This application is a National Stage of International Application No. PCT/CN2017/077514, filed Mar. 21, 2017, which claims the benefit of Chinese Patent Application No. 201610184723.0, filed with the Chinese Patent Office on Mar. 28, 2016, and entitled "A method and device for configuring communication", both of which are hereby incorporated by reference in their entireties.

FIELD

The present invention relates to the field of wireless communications, and particularly to a method and device for configuring communication.

BACKGROUND

In the $3^{rd}$ Generation Partnership Project (3GPP), a Device to Device (D2D) proximity service is different from traditional cellular network communication. For traditional cellular network communication, all the data shall be transmitted over a network; and for D2D communication, a link for direct communication can be set up between terminals as illustrated in FIG. 1.

D2D communication generally falls into the following two categories.

D2D Discovery (proximity service discovery): a User Equipment (UE) determines another proximate UE over an Evolved Universal Terrestrial Radio Access (E-UTRA) network. For example, a D2D UE can search for a proximate taxi, a proximate friend, etc., using this service. In a 3GPP system, the D2D link is also referred to as a Slide Link, so the D2D Discovery is also referred to as a Side Link Discovery.

D2D communication (proximity service communication): a link is established directly between two UEs proximate to each other (as illustrated in FIG. 1), so that a communication link originally over the network is converted into a local direct communication link to thereby save a significant bandwidth and improve the efficiency of the network; or two UEs proximate to each other can be provided with a stable, high-speed, and cheap communication service through communication over a direct link. Proximity service communication is generally conducted under the control or assistance of the network side, and even an evolved Node B (eNB) may allocate a resource dynamically for a UE in proximity service communication. In the 3GPP system, the D2D link is also referred as a Side Link, so D2D Communication is also referred to as Side Link Communication.

A UE participating in D2D discovery or communication plays the following two roles.

A D2D transmitting UE is a UE transmitting a D2D discovery or communication message.

A D2D receiving UE which is a UE receiving a D2D discovery or communication message transmitted by a D2D transmitting UE.

For a D2D receiving UE in the R13 and earlier releases, the UE receives a D2D discovery or communication signal according to a system broadcast or a preconfigured D2D receive resource pool. The system broadcast or the preconfigured D2D receive resource pool including D2D transmit resource pools of all the D2D transmitting UE is generally so large that the D2D receiving UE needs to listen constantly to the system broadcast or the preconfigured D2D receive resources, and thus may consume significant power.

In summary, the existing D2D receiving UE needs to listen constantly to the system broadcast or the preconfigured D2D receive resources, and thus may consume significant power.

SUMMARY

The invention provides a method and device for configuring communication so as to address the problem in the related art that the D2D receiving UE needs to listen constantly to the system broadcast or the preconfigured D2D receive resources, and thus may consume significant power.

An embodiment of the invention provides a method for configuring communication, the method including:

instructing, by a first terminal, a first network-side device to configure a second terminal to communicate; and determining, by the first terminal, a target communication period of time according to configuration information for determining the target communication period of time;

wherein the target communication period of time is a period of time in which direct communication interface transmission and/or reception can be performed via a direct communication interface.

An embodiment of the invention provides a method for configuring communication, the method including:

receiving, by a second terminal, configuration information for determining a target communication period of time from a network-side device, wherein the target communication period of time is a period of time in which direct communication interface transmission and/or reception can be performed via a direct communication interface; and determining, by the second terminal, the target communication period of time according to the configuration information.

An embodiment of the invention provides a method for configuring communication, the method including:

determining, by a first network-side device, configuration information for determining a target communication period of time, upon reception of an instruction transmitted by a first terminal to configure a second terminal to communicate, wherein the target communication period of time is a period of time in which direct communication interface transmission and/or reception can be performed via a direct communication interface; and transmitting, by the first network-side device, the configuration information to the second terminal, so that the second terminal determines the target communication period of time according to the configuration information.

An embodiment of the invention provides a method for configuring communication, the method including:

receiving, by a second network-side device, configuration information, for determining a target communication period of time, transmitted by a first network-side device, wherein the target communication period of time is a period of time in which direct communication interface transmission and/or reception can be performed via a direct communication interface; and transmitting, by the second network-side device, the configuration information to a second terminal, so that the second terminal determines the target communication period of time according to the configuration information.

An embodiment of the invention provides a first terminal for configuring communication, the first terminal including:

an instructing module configured to instruct a first network-side device to configure a second terminal to communicate; and a first time-period determining module configured to determine a target communication period of time according to configuration information for determining the target communication period of time;

wherein the target communication period of time is a period of time in which direct communication interface transmission and/or reception can be performed via a direct communication interface.

An embodiment of the invention provides a first terminal for configuring communication, the second terminal including:

a first receiving module configured to receive configuration information for determining a target communication period of time from a network-side device, wherein the target communication period of time is a period of time in which direct communication interface transmission and/or reception can be performed via a direct communication interface;

and a second time-period determining module configured to determine the target communication period of time according to the configuration information.

An embodiment of the invention provides a first network-side device for configuring communication, the first network-side device including:

an information determining module configured, upon reception of an instruction transmitted by a first terminal to configure a second terminal to communicate, to determine configuration information for determining a target communication period of time, wherein the target communication period of time is a period of time in which direct communication interface transmission and/or reception can be performed via a direct communication interface;

and a first transmitting module configured to transmit the configuration information to the second terminal, so that the second terminal determines the target communication period of time according to the configuration information.

An embodiment of the invention provides a second network-side device for configuring communication, the second network-side device including:

a second receiving module configured to receive configuration information, for determining a target communication period of time, transmitted by a first network-side device, wherein the target communication period of time is a period of time in which direct communication interface transmission and/or reception can be performed via a direct communication interface; and a second transmitting module configured to transmit the configuration information to a second terminal, so that the second terminal determines the target communication period of time according to the configuration information.

An embodiment of the invention provides a first terminal including:

a processor is configured to read and execute program in a memory:

to instruct a first network-side device through a transceiver to configure a second terminal to communicate; and to determine a target communication period of time according to configuration information for determining the target communication period of time where the target communication period of time is a period of time in which direct communication interface transmission and/or reception can be performed via a direct communication interface; and the transceiver configured to receive and transmit data under the control of the processor.

An embodiment of the invention provides a second terminal including:

a processor is configured to read and execute program in a memory:

to receive configuration information for determining a target communication period of time from a network-side device through a transceiver, wherein the target communication period of time is a period of time in which direct communication interface transmission and/or reception can be performed via a direct communication interface; and to determine the target communication period of time according to the configuration information; and the transceiver configured to receive and transmit data under the control of the processor.

An embodiment of the invention provides a first network-side device including:

a processor is configured to read and execute program in a memory:

upon reception of an instruction transmitted by a first terminal to configure a second terminal to communicate, through a transceiver, to determine configuration information for determining a target communication period of time, wherein the target communication period of time is a period of time in which direct communication interface transmission and/or reception can be performed via a direct communication interface; and to transmit the configuration information to the second terminal through the transceiver, so that the second terminal determines the target communication period of time according to the configuration information; and the transceiver configured to receive and transmit data under the control of the processor.

An embodiment of the invention provides a second network-side device including:

a processor is configured to read and execute program in a memory:

to receive configuration information, for determining a target communication period of time, transmitted by a first network-side device through a transceiver, wherein the target communication period of time is a period of time in which direct communication interface transmission and/or reception can be performed via a direct communication interface; and to transmit the configuration information to a second terminal, so that the second terminal determines the target communication period of time according to the configuration information; and the transceiver configured to receive and transmit data under the control of the processor.

In the embodiments of the invention, the first terminal instructs the first network-side device to configure the second terminal to communicate, and determines the target communication period of time according to the configuration information for determining the target communication period of time; and the first network-side device determines the configuration information for determining the target communication period of time, where the target communication period of time is a period of time in which direct communication interface transmission and/or reception can be performed via a direct communication interface, and the first network-side device transmits the configuration information to the second terminal, so that the terminals to communicate directly with each other determine the target communication period of time according to the configuration information, and perform direct communication interface transmission and/or reception in the target communication period of time, without listening constantly to any system broadcast or any preconfigured D2D receive resources, thus saving their power.

BRIEF DESCRIPTION OF THE DRAWINGS

In order to make the technical solutions according to the embodiments of the invention more apparent, the drawings to which reference is to be made in a description of the embodiments will be introduced below in brief, and apparently the drawings to be described below are only a part of the embodiments of the invention. Those ordinarily skilled in the art can further derive from these drawings other drawings without any inventive effort.

DETAILED DESCRIPTION OF THE EMBODIMENTS

In the embodiments of the invention, a first terminal instructs a first network-side device to configure a second terminal to communicate, and determines a target communication period of time according to configuration information for determining the target communication period of time; and the first network-side device determines the configuration information for determining the target communication period of time, where the target communication period of time is a period of time in which direct communication interface transmission and/or reception can be performed via a direct communication interface, and the first network-side device transmits the configuration information to the second terminal, so that the terminals to communicate directly with each other determine the target communication period of time according to the configuration information, and perform direct communication interface transmission and/or reception in the target communication period of time, without listening constantly to any system broadcast or any preconfigured D2D receive resources, thus saving their power.

Here A and/or B in the embodiments of the invention refer to three instances of only A, only B, and both A and B.

In order to make the objects, technical solutions, and advantages of the invention more apparent, the invention will be described below in further details with reference to the drawings, and apparently the embodiments described below are only a part but not all of the embodiments of the invention. Based upon the embodiments here of the invention, all the other embodiments which can occur to those skilled in the art without any inventive effort shall fall into the scope of the invention.

Figure 1:
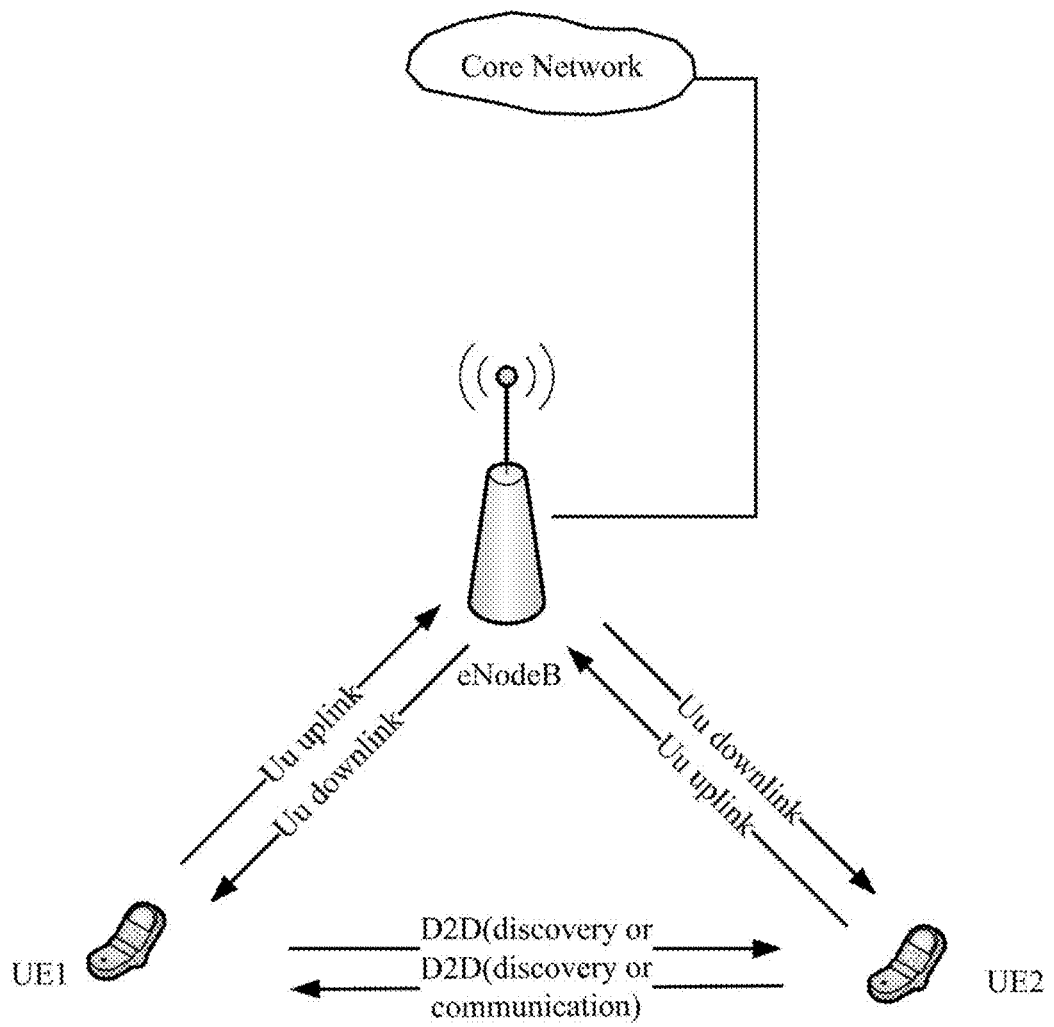
FIG. 1 is a schematic diagram of D2D communication in the related art.
Figure 2:
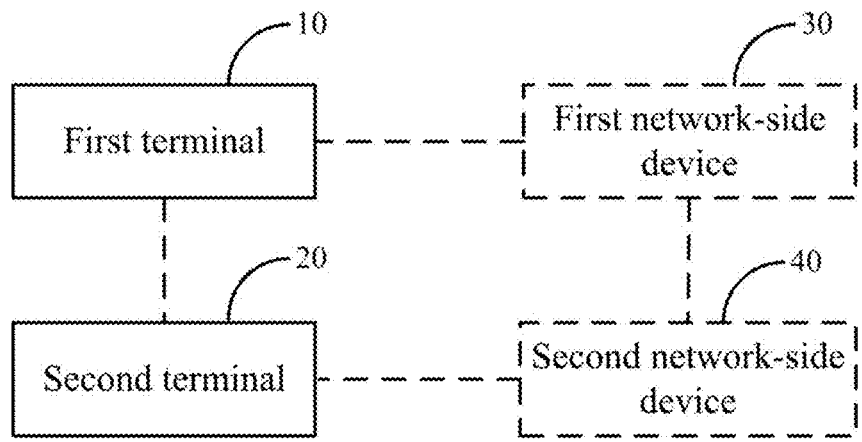
FIG. 2 is a schematic structural diagram of a system for configuring communication according to an embodiment of the invention.

As illustrated in FIG. 2, a system for configuring communication according to an embodiment of the invention includes followings.

A first terminal 10 is configured to instruct a first network-side device to configure a second terminal to communicate; and to determine a target communication period of time according to configuration information for determining the target communication period of time, where the target communication period of time is a period of time in which direct communication interface transmission and/or reception can be performed via a direct communication interface.

The second terminal 20 is configured to receive the configuration information for determining the target communication period of time; and to determine the target communication period of time according to the configuration information.

The first network-side device 30 is configured, upon reception of the instruction transmitted by the first terminal to configure the second terminal to communicate, to determine the configuration information for determining the target communication period of time, and to transmit the configuration information to the second terminal, so that the second terminal determines the target communication period of time according to the configuration information.

Here the first terminal and the second terminal are two terminals which can communicate directly with each other.

If the first terminal is a transmitting terminal in direct communication, then the second terminal will be a receiving terminal in direct communication.

If the first terminal is a receiving terminal in direct communication, then the second terminal will be a transmitting terminal in direct communication.

In an implementation, the first terminal and the second terminal may access different network-side devices, and if the first terminal accesses the first network-side device, and the second terminal does not access the first network-side device, then the first network-side device will transmit the configuration information to the second terminal through a second network-side device.

Particularly, the first network-side device transmits the configuration information to the second network-side device accessed by the second terminal.

Correspondingly the system according to the embodiment of the invention further includes:

a second network-side device 40 is configured to receive the configuration information, for determining the target communication period of time, transmitted by the first network-side device, and to transmit the configuration information to the second terminal, so that the second terminal determines the target communication period of time according to the configuration information.

In the embodiment of the invention, the first network-side device can determine the configuration information for determining the target communication period of time in one of the following implementations without being limited thereto.

1. The first terminal determines directly the configuration information for determining the target communication period of time, and notifies the first network-side device of the configuration information.

2. The first terminal determines desirable configuration information for determining the target communication period of time, and the network-side device determines the configuration information according to the configuration information, for determining the target communication period of time, desirable to the first terminal, and transmits the configuration information to the first terminal.

3. The network-side device determines directly the configuration information for determining the target communication period of time, and transmits the configuration information to the first terminal.

The respective implementations above will be introduced below respectively.

In the first implementation, the first terminal determines directly the configuration information for determining the target communication period of time, and notifies the first network-side device of the configuration information.

The first terminal determines the configuration information, and transmits the configuration information to the first network-side device in an instruction.

Correspondingly if the instruction to configure the second terminal to communicate includes the configuration information, for determining the target communication period of time, determined by the first terminal, then the first network-side device will determine the received configuration information, for determining the target communication period of time, determined by the first terminal as the configuration information to be transmitted to the second terminal.

Optionally, the first terminal determines the configuration information according to a part or all of the following parameters:

a traffic type of direct communication, e.g., Voice over Internet Protocol (VoIP) traffic, Vehicle to Things (V2X) traffic, etc.;

a service characteristic of direct communication, e.g., the periodicity of periodical traffic;

Semi-Persistent Scheduling (SPS) configuration of the first terminal and/or the second terminal, for example, including a periodicity, a Cell-Radio Network Temporary Identifier (C-RNTI), etc.; and Discontinuous Reception (DRX) and/or Discontinuous Transmission (DTX) configuration information for the first terminal and/or the second terminal over a Uu interface.

For example, the first network-side device can determine the configuration information so that the configuration information matches as much as possible with configuration information for the first terminal to determine a communication period of time over the Uu interface, for example, is aligned with DRX onduration (a DTX timer).

Of course, the configuration information can alternatively be determined according to configuration information for the first terminal to determine a communication period of time over the Uu interface, and configuration information for the second terminal to determine a communication period of time over the Uu interface (for example, notified by a serving base station of the second terminal to the first network-side device, and then notified by the first network-side device to the first terminal).

In another example, the first network-side device can further determine the configuration information so that the configuration information matches with an SPS configuration periodicity of the first terminal over the Uu interface, so an SPS activation instance of time of the first terminal matches with the communication period of time determined by the first terminal according to the configuration information.

In an implementation, before the first terminal determines the configuration information, the first terminal can further obtain identification information of the Uu interface of the second terminal via the direct communication interface; and/or obtain DRX and/or DTX configuration of a Uu interface of the second terminal via the direct communication interface. The identification information of the Uu interface of the second terminal is obtained so that the first network-side device can page the second terminal using the identification information. The DRX and/or DTX configuration of the Uu interface of the second terminal is obtained so that the first terminal or the first network-side device can determine more reasonably the configuration information for the communication period of time over the direct communication interface.

Optionally, the first terminal transmitting the configuration information to the first network-side device can further notify the first network-side device of identification information of a Uu interface.

Correspondingly, the first network-side device transmitting the configuration information can further notify the second terminal of the identification information of the Uu interface, and the configuration information.

The identification information of the Uu interface of the second terminal includes a UE identifier and a cell identifier.

In an implementation, the UE identifier is a Cell Radio Network Temporary Identifier (C-RNTI) or an SPS C-RNTI; and the cell identifier is an Evolved Universal Mobile Telecommunication System (UMTS) Terrestrial Radio Access network (EUTRAN) Cell Global Identifier (ECGI).

Optionally, the first terminal transmitting the configuration information to the first network-side device can further notify the first network-side device of the identifier of the direct communication interface of the first terminal, the identifier of the direct communication interface of the second terminal, and the configuration information.

Correspondingly, the first network-side device transmitting the configuration information can further transmit the identification information of the identifier of the direct communication interface of the first terminal, the identifier of the direct communication interface of the second terminal, and the configuration information to the second terminal.

Since a directly communication terminal may have direct communication links with a plurality of terminals, the identifier of the direct communication interface of the first terminal is transmitted so that the second terminal can identify to which one of the direct communication links the configuration information relates.

In an implementation, there is uni-cast communication between the first terminal and the second terminal, and the identifier of the direct communication interface of the first terminal, and the identifier of the direct communication interface of the second terminal are layer-2 identifiers of the direct communication interface; or there is broadcast communication between the first terminal and the second terminal, and the identifier of the direct communication interface of the first terminal, and the identifier of the direct communication interface of the second terminal are a layer-2 group identifier of the direct communication interface.

Optionally, the first network-side device determines a resource for direct communication according to the configuration information; and/or the first network-side device modifies DRX and/or DTX configuration of the first terminal over a Uu interface according to the configuration information.

Correspondingly, if the second terminal does not access the first network-side device, then the second network-side device will determine a resource for direct communication according to the configuration information; and/or modify DRX and/or DTX configuration of the second terminal over a Uu interface according to the configuration information after the first network-side device transmits the configuration information to the second network-side device.

In a second implementation, the first terminal determines desirable configuration information for determining the target communication period of time, and the network-side device determines the configuration information according to the configuration information, for determining the target communication period of time, desirable to the first terminal, and transmits the configuration information to the first terminal.

Particularly, the first terminal signals the desirable configuration information to the first network-side device.

Correspondingly, the first network-side device determines the configuration information to be transmitted to the second terminal, according to the received configuration information desirable to the first terminal.

Since the first terminal does not obtain the configuration information determined by the first network-side device either, the first network-side device shall also transmit the determined configuration information to the first terminal.

In an implementation, the first terminal can determine the configuration information according to a part or all of the following parameters:

a traffic type of direct communication;

a service characteristic of direct communication; SPS configuration of the first terminal and/or the second terminal; and DRX and/or DTX configuration information for the first terminal and/or the second terminal over a Uu interface.

When the first network-side device determines the configuration information to be transmitted to the first terminal, according to the received configuration information desirable to the first terminal, it can further determine the configuration information to be transmitted to the first terminal, according to both a part or all of the parameters above, and the configuration information desirable to the first terminal.

For example, the first network-side device can determine the configuration information so that the configuration information matches as much as possible with configuration information for the first terminal to determine a communication period of time over the Uu interface, for example, is aligned with DRX onduration.

Of course, the configuration information can alternatively be determined according to configuration information for the first terminal to determine a communication period of time over the Uu interface, and configuration information for the second terminal to determine a communication period of time over the Uu interface (for example, notified by a serving base station of the second terminal to the first network-side device, and then notified by the first network-side device to the first terminal).

In another example, the first network-side device can further determine the configuration information so that the configuration information matches with an SPS configuration periodicity of the first terminal over the Uu interface, so an SPS activation instance of time of the first terminal matches with the communication period of time determined by the first terminal according to the configuration information.

In an implementation, before the first terminal determines the configuration information, the first terminal can further obtain identification information of the Uu interface of the second terminal via the direct communication interface; and/or obtain DRX and/or DTX configuration of a Uu interface of the second terminal via the direct communication interface.

The identification information of the Uu interface of the second terminal is obtained so that the first network-side device can page the second terminal using the identification information. The DRX and/or DTX configuration of the Uu interface of the second terminal is obtained so that the first terminal or the first network-side device can determine more reasonably the configuration information for the communication period of time over the direct communication interface.

Optionally, the first network-side device can obtain DTX and/or DRX configuration of the current Uu interface of the second terminal from the first terminal via the Uu interface.

If the second terminal does not access the first network-side device, then the first network-side device may further obtain DTX and/or DRX configuration of the current Uu interface of the second terminal from the second network-side device accessed by the second terminal via an inter-eNB interface.

Correspondingly the second network-side device transmits the DTX and/or DRX configuration of the current Uu interface of the second terminal to the first network-side device.

Optionally, when the first terminal transmits the desirable configuration information to the first network-side device, it can further notify the first network-side device of identification information of a Uu interface, and the desirable configuration information.

Correspondingly, when the first network-side device transmits the configuration information, it can further notify the second terminal of the identification information of the Uu, and the configuration information.

The identification information of the Uu interface of the second terminal includes a UE identifier and a cell identifier.

In an implementation, the UE identifier is a C-RNTI or an SPS C-RNTI; and the cell identifier is an ECGI.

Optionally, when the first terminal transmits the desirable configuration to the first network-side device, it can further notify the first network-side device of the identifier of the direct communication interface of the first terminal, the identifier of the direct communication interface of the second terminal, and the configuration information.

Correspondingly, when the first network-side device transmits the configuration information, it can further transmit the identification information of the identifier of the direct communication interface of the first terminal, the identifier of the direct communication interface of the second terminal, and the configuration information to the second terminal.

In an implementation, there is uni-cast communication between the first terminal and the second terminal, and the identifier of the direct communication interface of the first terminal, and the identifier of the direct communication interface of the second terminal are layer-2 identifiers of the direct communication interface; or there is broadcast communication between the first terminal and the second terminal, and the identifier of the direct communication interface of the first terminal, and the identifier of the direct communication interface of the second terminal are a layer-2 group identifier of the direct communication interface.

Optionally, the first network-side device determines a resource for direct communication according to the configuration information; and/or the first network-side device modifies DRX and/or DTX configuration of the first terminal over a Uu interface according to the configuration information.

Correspondingly, if the second terminal does not access the first network-side device, then the second network-side device will determine a resource for direct communication according to the configuration information; and/or modify DRX and/or DTX configuration of the second terminal over a Uu interface according to the configuration information after the first network-side device transmits the configuration information to the second network-side device.

In a third implementation, the network-side device determines directly the configuration information for determining the target communication period of time, and transmits the configuration information to the first terminal.

Optionally the first network-side device determines the configuration information according to a part or all of the following parameters:

a traffic type of direct communication;

a traffic characteristic of direct communication;

SPS configuration of the first terminal and/or the second terminal; and

DRX and/or DTX configuration information for the first terminal and/or the second terminal over a Uu interface.

For example, the first network-side device can determine the configuration information so that the configuration information matches as much as possible with configuration information for the first terminal to determine a communication period of time over the Uu interface, for example, is aligned with DRX onduration.

Of course, the configuration information can alternatively be determined according to configuration information for the first terminal to determine a communication period of time over the Uu interface, and configuration information for the second terminal to determine a communication period of time over the Uu interface (for example, notified by a serving base station of the second terminal to the first network-side device, and then notified by the first network-side device to the first terminal).

In another example, the first network-side device can further determine the configuration information so that the configuration information matches with an SPS configuration periodicity of the first terminal over the Uu interface, so an SPS activation instance of time of the first terminal matches with the communication period of time determined by the first terminal according to the configuration information.

In an implementation, before the first terminal determines the configuration information, the first terminal can further obtain identification information of the Uu interface of the second terminal via the direct communication interface; and/or obtain DRX and/or DTX configuration of a Uu interface of the second terminal via the direct communication interface.

Optionally, the first network-side device can obtain DTX and/or DRX configuration of the current Uu interface of the second terminal from the first terminal via the Uu interface.

If the second terminal does not access the first network-side device, then the first network-side device may further obtain DTX and/or DRX configuration of the current Uu interface of the second terminal from the second network-side device accessed by the second terminal via an inter-eNB interface.

Correspondingly, the second network-side device transmits the DTX and/or DRX configuration of the current Uu interface of the second terminal to the first network-side device.

Optionally, when the first terminal transmits the desirable configuration information to the first network-side device, it can further notify the first network-side device of identification information of a Uu interface, and the desirable configuration information.

Correspondingly, when the first network-side device transmits the configuration information, it can further notify the second terminal of the identification information of the Uu, and the configuration information.

The identification information of the Uu interface of the second terminal includes a UE identifier and a cell identifier.

In an implementation, the UE identifier is a C-RNTI or an SPS C-RNTI; and the cell identifier is an ECGI.

Optionally, when the first terminal transmits the desirable configuration to the first network-side device, it can further notify the first network-side device of the identifier of the direct communication interface of the first terminal, the identifier of the direct communication interface of the second terminal, and the configuration information.

Correspondingly, when the first network-side device transmits the configuration information, it can further transmit the identification information of the identifier of the direct communication interface of the first terminal, the identifier of the direct communication interface of the second terminal, and the configuration information to the second terminal.

In an implementation, there is uni-cast communication between the first terminal and the second terminal, and the identifier of the direct communication interface of the first terminal, and the identifier of the direct communication interface of the second terminal are layer-2 identifiers of the direct communication interface; or there is broadcast communication between the first terminal and the second terminal, and the identifier of the direct communication interface of the first terminal, and the identifier of the direct communication interface of the second terminal are a layer-2 group identifier of the direct communication interface.

Optionally, the first network-side device determines a resource for direct communication according to the configuration information; and/or the first network-side device modifies DRX and/or DTX configuration of the first terminal over a Uu interface according to the configuration information.

Correspondingly, if the second terminal does not access the first network-side device, then the second network-side device will determine a resource for direct communication according to the configuration information; and/or modify DRX and/or DTX configuration of the second terminal over a Uu interface according to the configuration information after the first network-side device transmits the configuration information to the second network-side device.

In the second and third implementations above, if the second terminal does not access the first network-side device, then optionally the first network-side device and the second network-side device may negotiate with each other about the configuration information.

Particularly, the first network-side device obtains the DTX and/or DRX configuration of the current Uu interface of the second terminal through the second network-side device accessed by the second terminal; or the first network-side device obtains the configuration information desirable to the second terminal through the second network-side device accessed by the second terminal.

The first network-side device obtains the information above to thereby determine the communication period of time matching with the DTX and/or DRX configuration of the Uu interface of the two terminals.

Since the configuration information desirable to a terminal (the first terminal and/or the second terminal) also matches with the DTX and/or DRX configuration over the Uu interface, the configuration information to be obtained by the first network-side device can also enable the determined communication period of time to match with the DTX and/or DRX configuration of the two terminals over the Uu interface.

Optionally, the configuration information determined by the first terminal or the first network-side device can include but will not be limited to a part or all of the following information:
  onDurationTimer;
  drx-InactivityTimer;
  drx-RetransmissionTimer;
  LongDRX-CycleStartOffset;
  LongDTX-CycleStartOffset;
  ShortDRX-Cycle;
  ShortDTX-Cycle;
  DrxShortCycleTimer; and
  DtxShortCycleTimer.

Here, the network-side device according to the embodiment of the invention can be a base station (e.g., a macro base station, a home base station, etc.), or can be a Relay Node (RN) device, or can be another network-side device.

Figure 3:
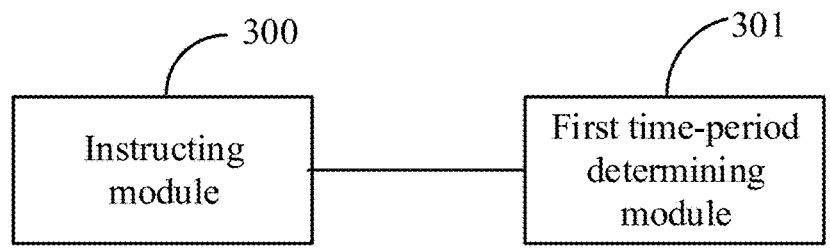
FIG. 3 is a schematic structural diagram of a first terminal according to an embodiment of the invention.

As illustrated in FIG. 3, a first terminal according to an embodiment of the invention includes followings.

An instructing module 300 is configured to instruct a first network-side device to configure a second terminal to communicate.

A first time-period determining module 301 is configured to determine a target communication period of time according to configuration information for determining the target communication period of time.

The target communication period of time is a period of time in which direct communication interface transmission and/or reception can be performed via a direct communication interface.

Optionally, the instructing module 300 is configured:
  to determine the configuration information, and to transmit the configuration information to the first network-side device, so that the first network-side device transmits the configuration information to the second terminal; or
  to transmit the desirable configuration information to the first network-side device, so that the first network-side device determines the configuration information to be transmitted to the first terminal and the second terminal, according to the received desirable configuration information.

Optionally, the instructing module 300 is configured to determine the configuration information according to a part or all of the following parameters:

A traffic type of direct communication; a traffic characteristic of direct communication; SPS configuration of the first terminal and/or the second terminal; and DRX and/or DTX configuration information for the first terminal and/or the second terminal over a Uu interface.

Optionally, the instructing module 300 is further configured:
  to obtain identification information of a Uu interface of the second terminal via the direct communication interface; and/or
  to obtain DRX and/or DTX configuration of a Uu interface of the second terminal via the direct communication interface.

Optionally, the instructing module 300 is further configured to notify the first network-side device of identification information of a Uu interface of the second terminal, and the configuration information.

Optionally, the identification information of the Uu interface of the second terminal includes a UE identifier and a cell identifier.

Optionally, the UE identifier is a C-RNTI or an SPS C-RNTI, and the cell identifier is an ECGI.

Optionally, the instructing module 300 is further configured to notify the first network-side device of the identifier of the direct communication interface of the first terminal, the identifier of the direct communication interface of the second terminal, and the configuration information.

In an implementation, there is uni-cast communication between the first terminal and the second terminal, and the identifier of the direct communication interface of the first terminal, and the identifier of the direct communication interface of the second terminal are layer-2 identifiers of the direct communication interface; or there is broadcast communication between the first terminal and the second terminal, and the identifier of the direct communication interface of the first terminal, and the identifier of the direct communication interface of the second terminal are a layer-2 group identifier of the direct communication interface.

Optionally, the configuration information includes a part or all of the following information:
  onDurationTimer; drx-InactivityTimer; drx-RetransmissionTimer; LongDRX-CycleStartOffset; LongDTX-CycleStartOffset; ShortDRX-Cycle; ShortDTX-Cycle; DrxShortCycleTimer; and DtxShortCycleTimer.

Figure 4:
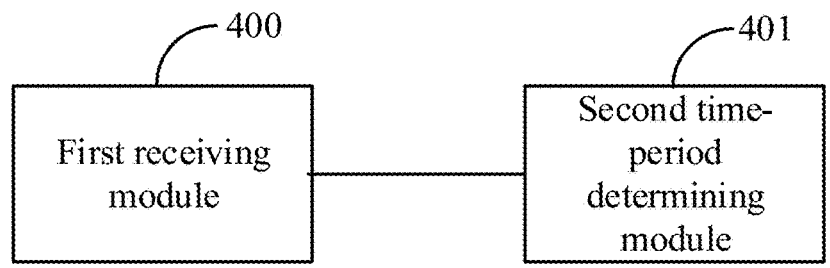
FIG. 4 is a schematic structural diagram of a second terminal according to an embodiment of the invention.

As illustrated in FIG. 4, a second terminal according to an embodiment of the invention includes followings.

A first receiving module 400 is configured to receive configuration information for determining a target communication period of time from a network-side device, where the target communication period of time is a period of time in which direct communication interface transmission and/or reception can be performed via a direct communication interface.

A second time-period determining module 401 is configured to determine the target communication period of time according to the configuration information.

Figure 5:
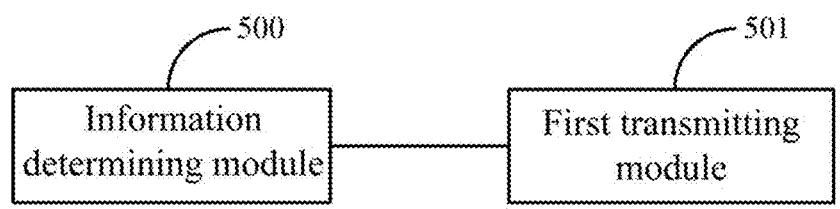
FIG. 5 is a schematic structural diagram of a first network-side device according to an embodiment of the invention.

As illustrated in FIG. 5, a first network-side device according to an embodiment of the invention includes followings.

An information determining module 500 is configured, upon reception of an instruction transmitted by a first terminal to configure a second terminal to communicate, to determine configuration information for determining a target communication period of time, where the target communication period of time is a period of time in which direct communication interface transmission and/or reception can be performed via a direct communication interface.

A first transmitting module 501 is configured to transmit the configuration information to the second terminal, so that the second terminal determines the target communication period of time according to the configuration information.

Optionally, the information determining module 500 is configured to determine the configuration information according to a part or all of the following parameters.

A traffic type of direct communication; a traffic characteristic of direct communication; SPS configuration of the first terminal and/or the second terminal; and DRX and/or DTX configuration information for the first terminal and/or the second terminal over a Uu interface.

Optionally, the first transmitting module 501 is further configured to transmit the configuration information to the first terminal.

Optionally, the information determining module 500 is configured:

if the instruction to configure the second terminal to communicate includes configuration information, for determining the target communication period of time, desirable to the first terminal, to determine the configuration information to be transmitted, according to the received configuration information, for determining the target communication period of time, desirable to the first terminal; or if the instruction to configure the second terminal to communicate includes the configuration information, for determining the target communication period of time, determined by the first terminal, to determine the received configuration information, for determining the target communication period of time, determined by the first terminal as the configuration information to be transmitted.

Optionally, the information determining module 500 is configured to determine the configuration information to be transmitted, according to received configuration information, for determining the target communication period of time, desirable to the first terminal.

The first transmitting module 501 is further configured to transmit the configuration information to the first terminal.

Optionally, if the parameters for determining the configuration information include DRX and/or DTX configuration information of the second terminal over a Uu interface, and the second terminal does not access the first network-side device, then the information determining module 500 is further configured:

to obtain DTX and/or DRX configuration of the current Uu interface of the second terminal from a second network-side device accessed by the second terminal via an inter-eNB interface; or to obtain DTX and/or DRX configuration of the current Uu interface of the second terminal from the first terminal via the Uu interface.

Optionally, the first transmitting module 501 is configured to transmit identification information of a Uu interface, and the configuration information.

Optionally, the identification information of the Uu interface of the second terminal includes a UE identifier and a cell identifier.

Optionally, the UE identifier is a C-RNTI or an SPS C-RNTI; and the cell identifier is an ECGI.

Optionally, the first transmitting module 501 is configured to transmit the identifier of the direct communication interface of the first terminal, the identifier of the direct communication interface of the second terminal, and the configuration information.

Optionally, there is uni-cast communication between the first terminal and the second terminal, and the identifier of the direct communication interface of the first terminal, and the identifier of the direct communication interface of the second terminal are layer-2 identifiers of the direct communication interface; or there is broadcast communication between the first terminal and the second terminal, and the identifier of the direct communication interface of the first terminal, and the identifier of the direct communication interface of the second terminal are a layer-2 group identifier of the direct communication interface.

Optionally, the information determining module 500 is further configured:

to determine a resource for direct communication according to the configuration information; and/or to modify DRX and/or DTX configuration of the first terminal over a Uu interface according to the configuration information.

Optionally, the first transmitting module 501 is configured:

if the second terminal does not access the first network-side device, to transmit the configuration information to the second terminal through a second network-side device accessed by the second terminal.

Optionally, the configuration information includes a part or all of the following information:

onDurationTimer; drx-InactivityTimer; drx-RetransmissionTimer; LongDRX-CycleStartOffset; LongDTX-CycleStartOffset; ShortDRX-Cycle; ShortDTX-Cycle; DrxShortCycleTimer; and DtxShortCycleTimer.

Figure 6:
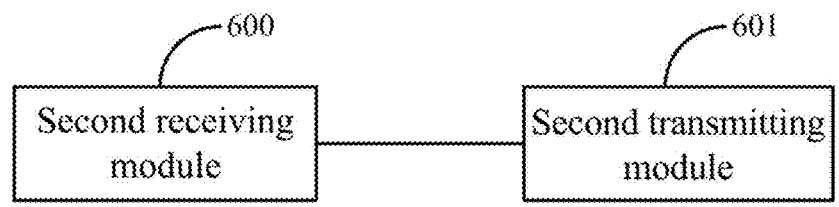
FIG. 6 is a schematic structural diagram of a second network-side device according to an embodiment of the invention.

As illustrated in FIG. 6, a second network-side device according to an embodiment of the invention includes followings.

A second receiving module 600 is configured to receive configuration information, for determining a target communication period of time, transmitted by a first network-side device, where the target communication period of time is a period of time in which direct communication interface transmission and/or reception can be performed via a direct communication interface.

A second transmitting module 601 is configured to transmit the configuration information to a second terminal, so that the second terminal determines the target communication period of time according to the configuration information.

Optionally, the second transmitting module 601 is further configured to transmit DRX/DTX configuration of the current Uu interface of the second terminal to the first network-side device.

Optionally, the second transmitting module 601 is further configured:

to determine a resource for direct communication according to the configuration information; and/or to modify DRX and/or DTX configuration of the first terminal over a Uu interface according to the configuration information.

Figure 7:
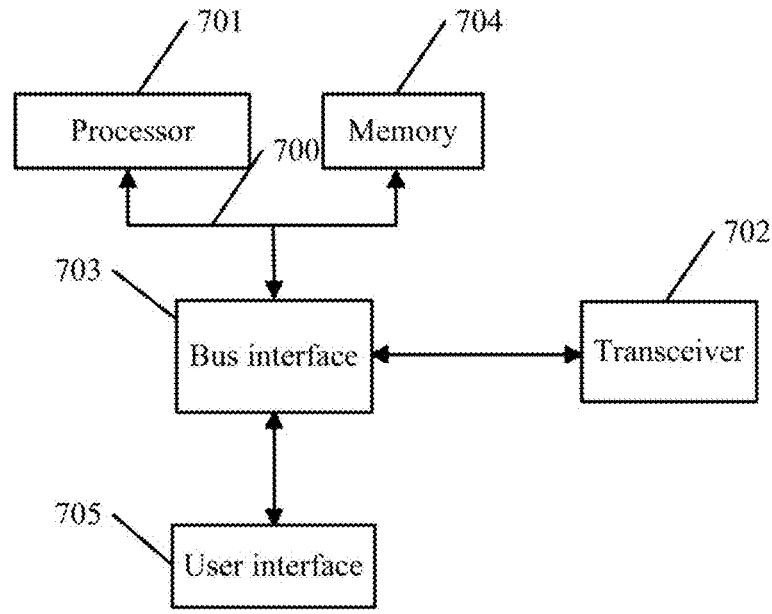
FIG. 7 is a schematic structural diagram of another first terminal according to an embodiment of the invention.

As illustrated in FIG. 7, another first terminal according to an embodiment of the invention includes followings.

A processor 701 is configured to read and execute program in a memory 704 to instruct a first network-side device through a transceiver 702 to configure a second terminal to communicate; and to determine a target communication period of time according to configuration information for determining the target communication period of time where the target communication period of time is a period of time in which direct communication interface transmission and/or reception can be performed via a direct communication interface.

The transceiver 702 is configured to receive and transmit data under the control of the processor 701.

Optionally, the processor 701 is configured:

to determine the configuration information, and to transmit the configuration information to the first network-side device, so that the first network-side device transmits the configuration information to the second terminal; or to transmit the desirable configuration information to the first network-side device, so that the first network-side device determines the configuration information to be transmitted to the first terminal and the second terminal, according to the received desirable configuration information.

Optionally the processor 701 is configured to determine the configuration information according to a part or all of the following parameters.

A traffic type of direct communication; a traffic characteristic of direct communication; SPS configuration of the first terminal and/or the second terminal; and DRX and/or DTX configuration information for the first terminal and/or the second terminal over a Uu interface.

Optionally, the processor 701 is further configured:

to obtain identification information of a Uu interface of the second terminal via the direct communication interface; and/or to obtain DRX and/or DTX configuration of a Uu interface of the second terminal via the direct communication interface.

Optionally, the processor 701 is further configured to notify the first network-side device of identification information of a Uu interface of the second terminal, and the configuration information.

Optionally, the identification information of the Uu interface of the second terminal includes a UE identifier and a cell identifier.

Optionally, the UE identifier is a C-RNTI or an SPS C-RNTI, and the cell identifier is an ECGI.

Optionally the processor 701 is further configured to notify the first network-side device of the identifier of the direct communication interface of the first terminal, the identifier of the direct communication interface of the second terminal, and the configuration information.

In an implementation, there is uni-cast communication between the first terminal and the second terminal, and the identifier of the direct communication interface of the first terminal, and the identifier of the direct communication interface of the second terminal are layer-2 identifiers of the direct communication interface; or there is broadcast communication between the first terminal and the second terminal, and the identifier of the direct communication interface of the first terminal, and the identifier of the direct communication interface of the second terminal are a layer-2 group identifier of the direct communication interface.

Optionally, the configuration information includes a part or all of the following information:

onDurationTimer; drx-InactivityTimer; drx-RetransmissionTimer; LongDRX-CycleStartOffset; LongDTX-CycleStartOffset; ShortDRX-Cycle; ShortDTX-Cycle; DrxShortCycleTimer; and DtxShortCycleTimer.

In FIG. 7, in the bus architecture (represented as a bus 700), the bus 700 can include any number of interconnecting buses and bridges to particularly link together various circuits including one or more processors represented by the processor 701, and one or more memories represented by the memory 704. The bus 700 can further link together various other circuits, e.g., a peripheral device, a manostat, a power management circuit, etc., all of which are well known in the art, so a further description thereof will be omitted in this context. A bus interface 703 serves as an interface between the bus 700 and the transceiver 702. The transceiver 702 can be an element, or a number of elements, e.g., a plurality of receivers and transmitters, which are units for communication with various other devices over a transmission medium. For example, the transceiver 702 receives external data from another device. The transceiver 702 is configured to transmit data processed by the processor 701 to the other device. A user interface 705, e.g., a keypad, a display, a loudspeaker, a microphone, a joystick, etc., can be further provided dependent upon the nature of a computing system.

The processor 701 is responsible for managing the bus 700 and performing normal processes, e.g., running a general operating system. The memory 704 can be configured to store data for use by the processor 701 in performing operations.

Optionally, the processor 701 can be a Central Processing Unit (CPU), an Application Specific Integrated Circuit (ASIC), a Field-Programmable Gate Array (FPGA), or a Complex Programmable Logic Device (CPLD).

Figure 8:
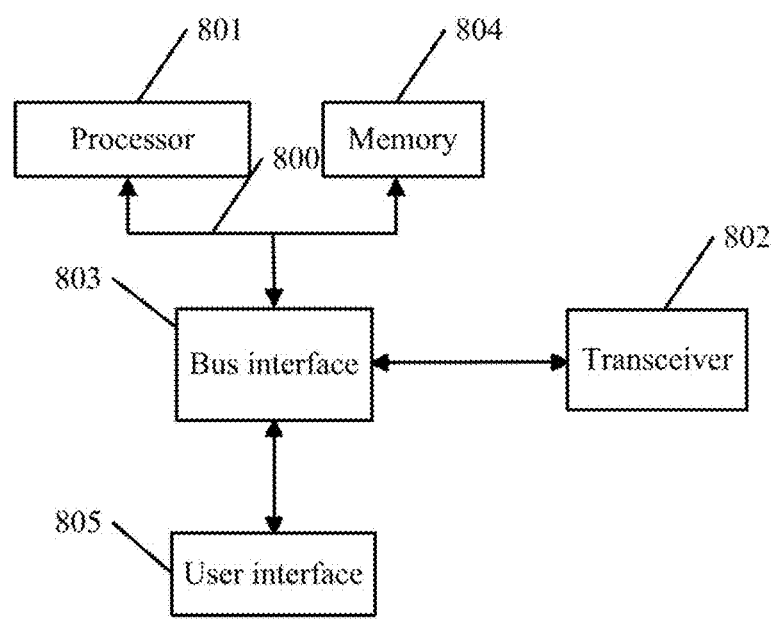
FIG. 8 is a schematic structural diagram of another second terminal according to an embodiment of the invention.

As illustrated in FIG. 8, another second terminal according to an embodiment of the invention includes followings.

A processor 801 is configured to read and execute program in a memory 804 to receive configuration information for determining a target communication period of time from a network-side device through a transceiver 802, where the target communication period of time is a period of time in which direct communication interface transmission and/or reception can be performed via a direct communication interface; and to determine the target communication period of time according to the configuration information.

The transceiver 802 is configured to receive and transmit data under the control of the processor 801.

In FIG. 8, in the bus architecture (represented as a bus 800), the bus 800 can include any number of interconnecting buses and bridges to particularly link together various circuits including one or more processors represented by the processor 801, and one or more memories represented by the memory 804. The bus 800 can further link together various other circuits, e.g., a peripheral device, a manostat, a power management circuit, etc., all of which are well known in the art, so a further description thereof will be omitted in this context. A bus interface 803 serves as an interface between the bus 700 and the transceiver 802. The transceiver 802 can be an element, or a number of elements, e.g., a plurality of receivers and transmitters, which are units for communication with various other devices over a transmission medium. For example, the transceiver 802 receives external data from another device. The transceiver 802 is configured to transmit data processed by the processor 801 to the other device. A user interface 805, e.g., a keypad, a display, a loudspeaker, a microphone, a joystick, etc., can be further provided dependent upon the nature of a computing system.

The processor 801 is responsible for managing the bus 800 and performing normal processes, e.g., running a general operating system. The memory 804 can be configured to store data for use by the processor 801 in performing operations.

Optionally, the processor 801 can be a CPU, an ASIC, an FPGA, or a CPLD.

Figure 9:
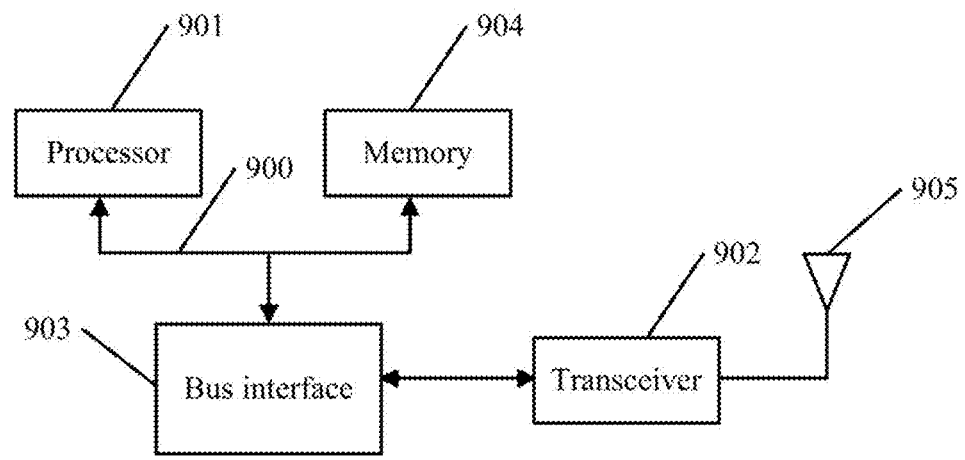
FIG. 9 is a schematic structural diagram of another first network-side device according to an embodiment of the invention.

As illustrated in FIG. 9, another first network-side device according to an embodiment of the invention includes followings.

A processor 901 is configured to read and execute program in a memory 904:

upon reception of an instruction transmitted by a first terminal to configure a second terminal to communicate, through a transceiver 902, to determine configuration information for determining a target communication period of time, where the target communication period of time is a period of time in which direct communication interface transmission and/or reception can be performed via a direct communication interface; and to transmit the configuration information to the second terminal through the transceiver 902, so that the second terminal determines the target communication period of time according to the configuration information.

The transceiver 902 is configured to receive and transmit data under the control of the processor 901.

Optionally, the processor 901 is configured to determine the configuration information according to a part or all of the following parameters.

A traffic type of direct communication; a traffic characteristic of direct communication; SPS configuration of the first terminal and/or the second terminal; and DRX and/or DTX configuration information for the first terminal and/or the second terminal over a Uu interface.

Optionally, the processor 901 is further configured to transmit the configuration information to the first terminal through the transceiver 902.

Optionally, the processor 901 is configured:

if the instruction to configure the second terminal to communicate includes configuration information, for determining the target communication period of time, desirable to the first terminal, to determine the configuration information to be transmitted, according to the received configuration information, for determining the target communication period of time, desirable to the first terminal; or if the instruction to configure the second terminal to communicate includes the configuration information, for determining the target communication period of time, determined by the first terminal, to determine the received configuration information, for determining the target communication period of time, determined by the first terminal as the configuration information to be transmitted.

Optionally, the processor 901 is configured to determine the configuration information to be transmitted, according to received configuration information, for determining the target communication period of time, desirable to the first terminal.

The processor 901 is further configured to transmit the configuration information to the first terminal through the transceiver 902.

Optionally, if the parameters for determining the configuration information include DRX and/or DTX configuration information of the second terminal over a Uu interface, and the second terminal does not access the first network-side device, then the processor 901 is further configured:

to obtain DTX and/or DRX configuration of the current Uu interface of the second terminal from a second network-side device accessed by the second terminal via an inter-eNB interface; or to obtain DTX and/or DRX configuration of the current Uu interface of the second terminal from the first terminal via the Uu interface.

Optionally, the processor 901 is configured to transmit identification information of a Uu interface, and the configuration information through the transceiver 902.

Optionally, the identification information of the Uu interface of the second terminal includes a UE identifier and a cell identifier.

Optionally, the UE identifier is a C-RNTI or an SPS C-RNTI; and the cell identifier is an ECGI.

Optionally, the processor 901 is configured to transmit the identifier of the direct communication interface of the first terminal, the identifier of the direct communication interface of the second terminal, and the configuration information through the transceiver 902.

Optionally, there is uni-cast communication between the first terminal and the second terminal, and the identifier of the direct communication interface of the first terminal, and the identifier of the direct communication interface of the second terminal are layer-2 identifiers of the direct communication interface; or there is broadcast communication between the first terminal and the second terminal, and the identifier of the direct communication interface of the first terminal, and the identifier of the direct communication interface of the second terminal are a layer-2 group identifier of the direct communication interface.

Optionally, the processor 901 is further configured:

to determine a resource for direct communication according to the configuration information; and/or to modify DRX and/or DTX configuration of the first terminal over a Uu interface according to the configuration information.

Optionally the processor 901 is configured:

if the second terminal does not access the first network-side device, to transmit the configuration information to the second terminal through a second network-side device accessed by the second terminal.

Optionally the configuration information includes a part or all of the following information:

onDurationTimer; drx-InactivityTimer; drx-RetransmissionTimer; LongDRX-CycleStartOffset; LongDTX-CycleStartOffset; ShortDRX-Cycle; ShortDTX-Cycle; DrxShortCycleTimer; and DtxShortCycleTimer.

In FIG. 9, the bus architecture (represented as a bus 900), the bus 900 can include any number of interconnecting buses and bridges to particularly link together various circuits including one or more processors represented by the processor 901, and one or more memories represented by the memory 904. The bus 900 can further link together various other circuits, e.g., a peripheral device, a manostat, a power management circuit, etc., all of which are well known in the art, so a further description thereof will be omitted in this context. A bus interface 903 serves as an interface between the bus 700 and the transceiver 902. The transceiver 902 can be an element, or a number of elements, e.g., a plurality of receivers and transmitters, which are units for communication with various other devices over a transmission medium. Data processed by the processor 901 are transmitted a wireless medium through an antenna 905, and furthermore the antenna 905 receives and transports data to the processor 901.

The processor 901 is responsible for managing the bus 900 and performing normal processes, and can further provide various functions, e.g., timing, a peripheral interface, voltage regulation, power source management, and other control functions. The memory 904 can be configured to store data for use by the processor 901 in performing operations.

Optionally, the processor 901 can be a CPU, an ASIC, an FPGA, or a CPLD.

Figure 10:
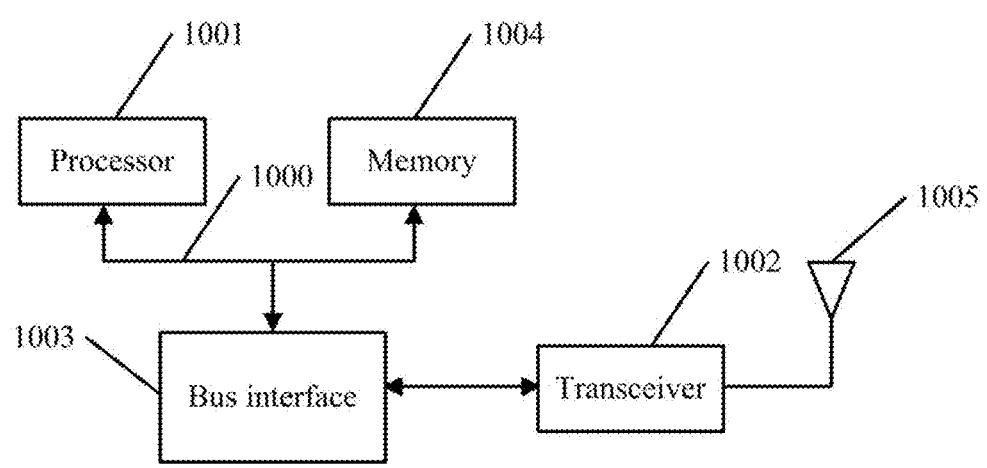
FIG. 10 is a schematic structural diagram of another second network-side device according to an embodiment of the invention.

As illustrated in FIG. 10, another second network-side device according to an embodiment of the invention includes followings.

A processor 1001 is configured to read and execute program in a memory 1004 to receive configuration information, for determining a target communication period of time, transmitted by a first network-side device through a transceiver 1002, where the target communication period of time is a period of time in which direct communication interface transmission and/or reception can be performed via a direct communication interface; and to transmit the configuration information to a second terminal, so that the second terminal determines the target communication period of time according to the configuration information.

The transceiver 1002 is configured to receive and transmit data under the control of the processor 1001.

Optionally, the processor 1001 is further configured to transmit DRX/DTX configuration of the current Uu interface of the second terminal to the first network-side device.

Optionally, the processor 1001 is further configured:

to determine a resource for direct communication according to the configuration information; and/or to modify DRX and/or DTX configuration of the first terminal over a Uu interface according to the configuration information.

In FIG. 10, the bus architecture (represented as a bus 1000), the bus 1000 can include any number of interconnecting buses and bridges to particularly link together various circuits including one or more processors represented by the processor 1001, and one or more memories represented by the memory 1004. The bus 1000 can further link together various other circuits, e.g., a peripheral device, a manostat, a power management circuit, etc., all of which are well known in the art, so a further description thereof will be omitted in this context. A bus interface 1003 serves as an interface between the bus 700 and the transceiver 1002. The transceiver 1002 can be an element, or a number of elements, e.g., a plurality of receivers and transmitters, which are units for communication with various other devices over a transmission medium. Data processed by the processor 1001 are transmitted a wireless medium through an antenna 1005, and furthermore the antenna 1005 receives and transports data to the processor 1001.

The processor 1001 is responsible for managing the bus 1000 and performing normal processes, and can further provide various functions, e.g., timing, a peripheral interface, voltage regulation, power source management, and other control functions. The memory 1004 can be configured to store data for use by the processor 1001 in performing operations.

Optionally, the processor 1001 can be a CPU, an ASIC, an FPGA, or a CPLD.

Based upon the same inventive idea, an embodiment of the invention further provides a method for configuring communication, and since a device corresponding to the method is the first terminal in the system for configuring communication according to the embodiment of the invention, and this method addresses the problem under a similar principle to the device, reference can be made to the implementation of the method for an implementation of the device, and a repeated description thereof will be omitted here.

Figure 11:
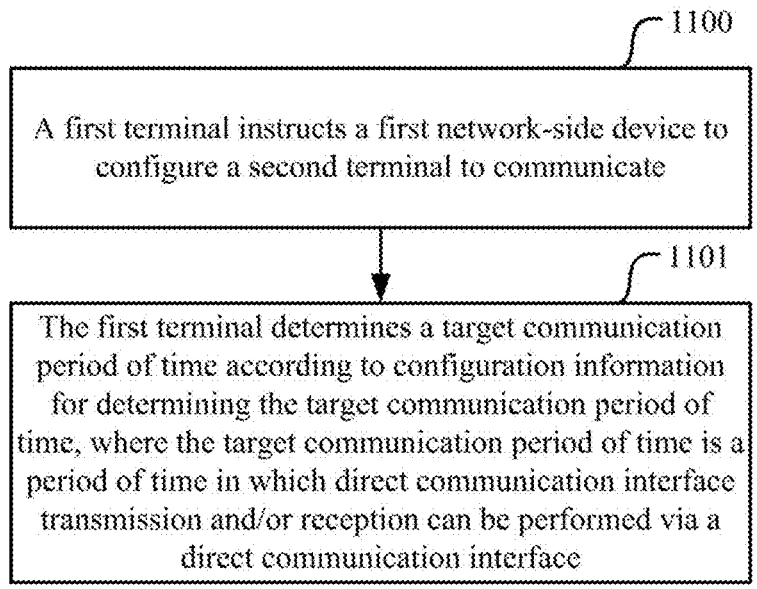
FIG. 11 is a schematic flow chart of a first method for configuring communication according to an embodiment of the invention.

As illustrated in FIG. 11, a first method for configuring communication according to an embodiment of the invention includes followings.

In the step 1100, a first terminal instructs a first network-side device to configure a second terminal to communicate.

In the step 1101, the first terminal determines a target communication period of time according to configuration information for determining the target communication period of time.

The target communication period of time is a period of time in which direct communication interface transmission and/or reception can be performed via a direct communication interface.

Optionally, the first terminal instructs the first network-side device to configure the second terminal to communicate as follows:

the first terminal determines the configuration information, and transmits the configuration information to the first network-side device, so that the first network-side device transmits the configuration information to the second terminal; or the first terminal transmits the desirable configuration information to the first network-side device, so that the first network-side device determines the configuration information to be transmitted to the first terminal and the second terminal, according to the received desirable configuration information.

Optionally, the first terminal determines the configuration information for determining the target communication period of time as follows.

The first terminal determines the configuration information according to a part or all of the following parameters.

A traffic type of direct communication; a traffic characteristic of direct communication; SPS configuration of the first terminal and/or the second terminal; and DRX and/or DTX configuration information for the first terminal and/or the second terminal over a Uu interface.

Optionally, before the first terminal determines the configuration information, the method further includes:

the first terminal obtains identification information of a Uu interface of the second terminal via the direct communication interface; and/or the first terminal obtains DRX and/or DTX configuration of a Uu interface of the second terminal via the direct communication interface.

Optionally, the first terminal further transmits the configuration information to the first network-side device as follows:

the first terminal notifies the first network-side device of identification information of a Uu interface of the second terminal, and the configuration information.

Optionally, the identification information of the Uu interface of the second terminal includes a UE identifier and a cell identifier.

Optionally, the UE identifier is a C-RNTI or an SPS C-RNTI, and the cell identifier is an ECGI.

Optionally, the first terminal further transmits the configuration information to the first network-side device as follows:

the first terminal notifies the first network-side device of the identifier of the direct communication interface of the first terminal, the identifier of the direct communication interface of the second terminal, and the configuration information.

In an implementation, there is uni-cast communication between the first terminal and the second terminal, and the identifier of the direct communication interface of the first terminal, and the identifier of the direct communication interface of the second terminal are layer-2 identifiers of the direct communication interface; or there is broadcast communication between the first terminal and the second terminal, and the identifier of the direct communication interface of the first terminal, and the identifier of the direct communication interface of the second terminal are a layer-2 group identifier of the direct communication interface.

Optionally, the configuration information includes a part or all of the following information:

onDurationTimer; drx-InactivityTimer; drx-RetransmissionTimer; LongDRX-CycleStartOffset; LongDTX-CycleStartOffset; ShortDRX-Cycle; ShortDTX-Cycle; DrxShortCycleTimer; and DtxShortCycleTimer.

Based upon the same inventive idea, an embodiment of the invention further provides a method for configuring communication, and since a device corresponding to the method is the second terminal in the system for configuring communication according to the embodiment of the invention, and this method addresses the problem under a similar principle to the device, reference can be made to the implementation of the method for an implementation of the device, and a repeated description thereof will be omitted here.

Figure 12:
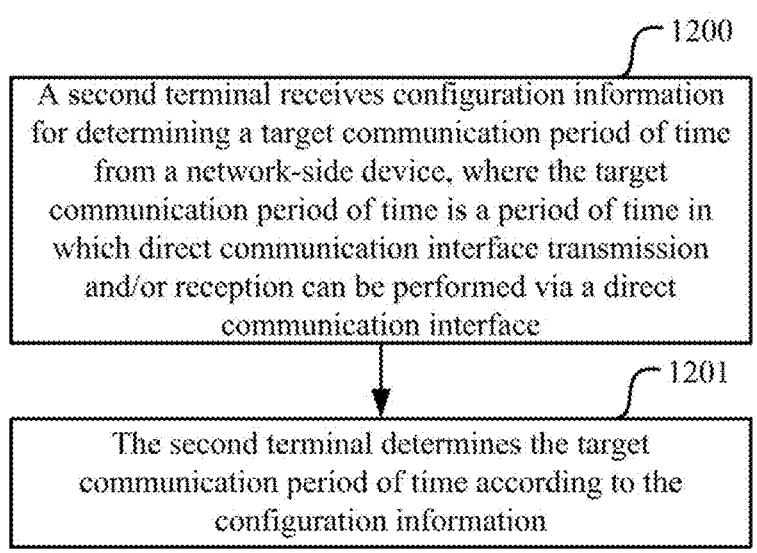
FIG. 12 is a schematic flow chart of a second method for configuring communication according to an embodiment of the invention.

As illustrated in FIG. 12, a second method for configuring communication according to an embodiment of the invention includes followings.

In the step 1200, a second terminal receives configuration information for determining a target communication period of time from a network-side device, where the target communication period of time is a period of time in which direct communication interface transmission and/or reception can be performed via a direct communication interface.

In the step 1201, the second terminal determines the target communication period of time according to the configuration information.

Based upon the same inventive idea, an embodiment of the invention further provides a method for configuring communication, and since a device corresponding to the method is the first network-side device in the system for configuring communication according to the embodiment of the invention, and this method addresses the problem under a similar principle to the device, reference can be made to the implementation of the method for an implementation of the device, and a repeated description thereof will be omitted here.

Figure 13:
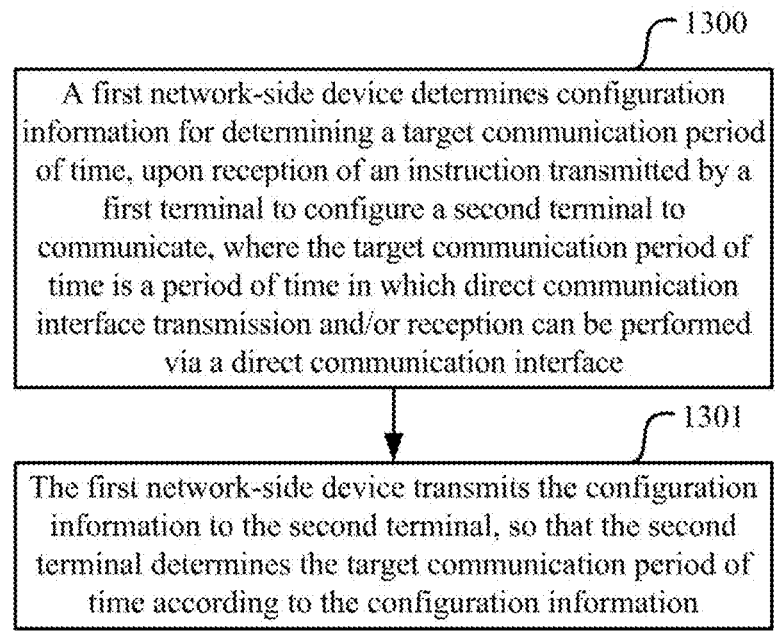
FIG. 13 is a schematic flow chart of a third method for configuring communication according to an embodiment of the invention.

As illustrated in FIG. 13, a third method for configuring communication according to an embodiment of the invention includes followings.

In the step 1300, a first network-side device determines configuration information for determining a target communication period of time, upon reception of an instruction transmitted by a first terminal to configure a second terminal to communicate, where the target communication period of time is a period of time in which direct communication interface transmission and/or reception can be performed via a direct communication interface.

In the step 1301, the first network-side device transmits the configuration information to the second terminal, so that the second terminal determines the target communication period of time according to the configuration information.

Optionally, the first network-side device determines the configuration information for determining the target communication period of time as follows.

The first network-side device determines the configuration information according to a part or all of the following parameters:

a traffic type of direct communication; a traffic characteristic of direct communication; SPS configuration of the first terminal and/or the second terminal; and DRX and/or DTX configuration information for the first terminal and/or the second terminal over a Uu interface.

Optionally, after the first network-side device determines the configuration information for determining the target communication period of time, the method further includes:

the first network-side device transmits the configuration information to the first terminal.

Optionally, the first network-side device determines the configuration information for determining the target communication period of time as follows:

if the instruction to configure the second terminal to communicate includes configuration information, for determining the target communication period of time, desirable to the first terminal, then the first network-side will determine the configuration information to be transmitted, according to the received configuration information, for determining the target communication period of time, desirable to the first terminal; or if the instruction to configure the second terminal to communicate includes the configuration information, for determining the target communication period of time, determined by the first terminal, then the first network-side will determine the received configuration information, for determining the target communication period of time, determined by the first terminal as the configuration information to be transmitted.

Optionally, the first network-side determines the configuration information to be transmitted, according to received configuration information, for determining the target communication period of time, desirable to the first terminal.

After the first network-side device determines the configuration information for determining the target communication period of time, the method further includes:

the first network-side transmits the configuration information to the first terminal.

Optionally, if the parameters for determining the configuration information include DRX and/or DTX configuration information of the second terminal over a Uu interface, and the second terminal does not access the first network-side device, then before the first network-side device determines the configuration information for determining the target communication period of time, the method further includes:

the first network-side obtains DTX and/or DRX configuration of the current Uu interface of the second terminal from a second network-side device accessed by the second terminal via an inter-eNB interface; or the first network-side obtains DTX and/or DRX configuration of the current Uu interface of the second terminal from the first terminal via the Uu interface.

Optionally, the first network-side transmits identification information of a Uu interface, and the configuration information.

Optionally, the identification information of the Uu interface of the second terminal includes a UE identifier and a cell identifier.

Optionally, the UE identifier is a C-RNTI or an SPS C-RNTI; and the cell identifier is an ECGI.

Optionally, the first network-side transmits the identifier of the direct communication interface of the first terminal, the identifier of the direct communication interface of the second terminal, and the configuration information.

Optionally, there is uni-cast communication between the first terminal and the second terminal, and the identifier of the direct communication interface of the first terminal, and the identifier of the direct communication interface of the second terminal are layer-2 identifiers of the direct communication interface; or there is broadcast communication between the first terminal and the second terminal, and the identifier of the direct communication interface of the first terminal, and the identifier of the direct communication interface of the second terminal are a layer-2 group identifier of the direct communication interface.

Optionally, after the first network-side device determines the configuration information for determining the target communication period of time, the method further includes:

the first network-side determines a resource for direct communication according to the configuration information; and/or the first network-side modifies DRX and/or DTX configuration of the first terminal over a Uu interface according to the configuration information.

Optionally, the first network-side transmits the configuration information to the second terminal as follows:

if the second terminal does not access the first network-side device, then the first network-side will transmit the configuration information to the second terminal through a second network-side device accessed by the second terminal.

Optionally, the configuration information includes a part or all of the following information:

onDurationTimer; drx-InactivityTimer; drx-RetransmissionTimer; LongDRX-CycleStartOffset; LongDTX-CycleStartOffset; ShortDRX-Cycle; ShortDTX-Cycle; DrxShortCycleTimer; and DtxShortCycleTimer.

Based upon the same inventive idea, an embodiment of the invention further provides a method for configuring communication, and since a device corresponding to the method is the second network-side device in the system for configuring communication according to the embodiment of the invention, and this method addresses the problem under a similar principle to the device, reference can be made to the implementation of the method for an implementation of the device, and a repeated description thereof will be omitted here.

Figure 14:
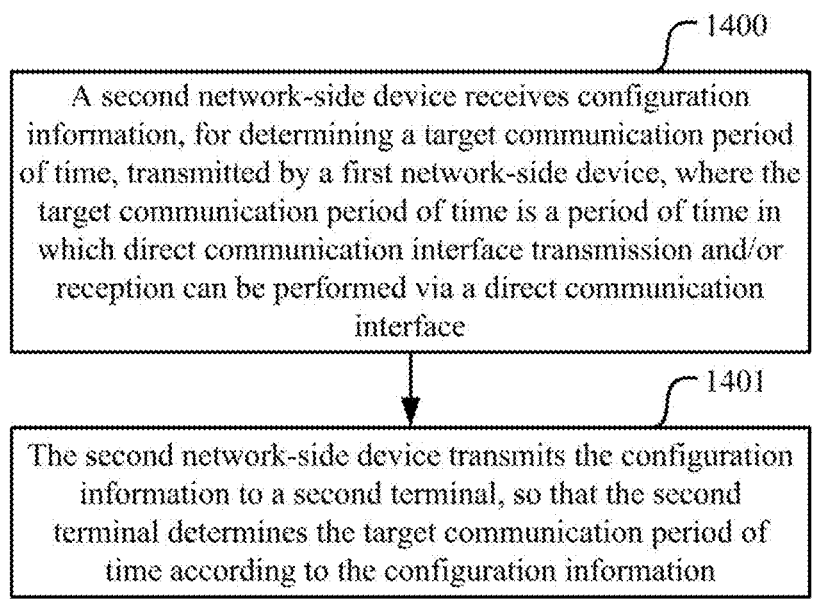
FIG. 14 is a schematic flow chart of a fourth method for configuring communication according to an embodiment of the invention.

As illustrated in FIG. 14, a fourth method for configuring communication according to an embodiment of the invention includes followings.

In the step 1400, a second network-side device receives configuration information, for determining a target communication period of time, transmitted by a first network-side device, where the target communication period of time is a period of time in which direct communication interface transmission and/or reception can be performed via a direct communication interface.

In the step 1401, the second network-side device transmits the configuration information to a second terminal, so that the second terminal determines the target communication period of time according to the configuration information.

Optionally, before the second network-side device receives the configuration information, for determining the target communication period of time, transmitted by the first network-side device, the method further includes:

the second network-side device transmits DRX/DTX configuration of the current Uu interface of the second terminal to the first network-side device.

Optionally, after the second network-side device receives the configuration information, for determining the target communication period of time, transmitted by the first network-side device, the method further includes:

the second network-side device determines a resource for direct communication according to the configuration information; and/or the second network-side device modifies DRX and/or DTX configuration of the first terminal over a Uu interface according to the configuration information.

The solutions according to the invention will be described below in details in connection particular embodiments thereof.

Figure 15:
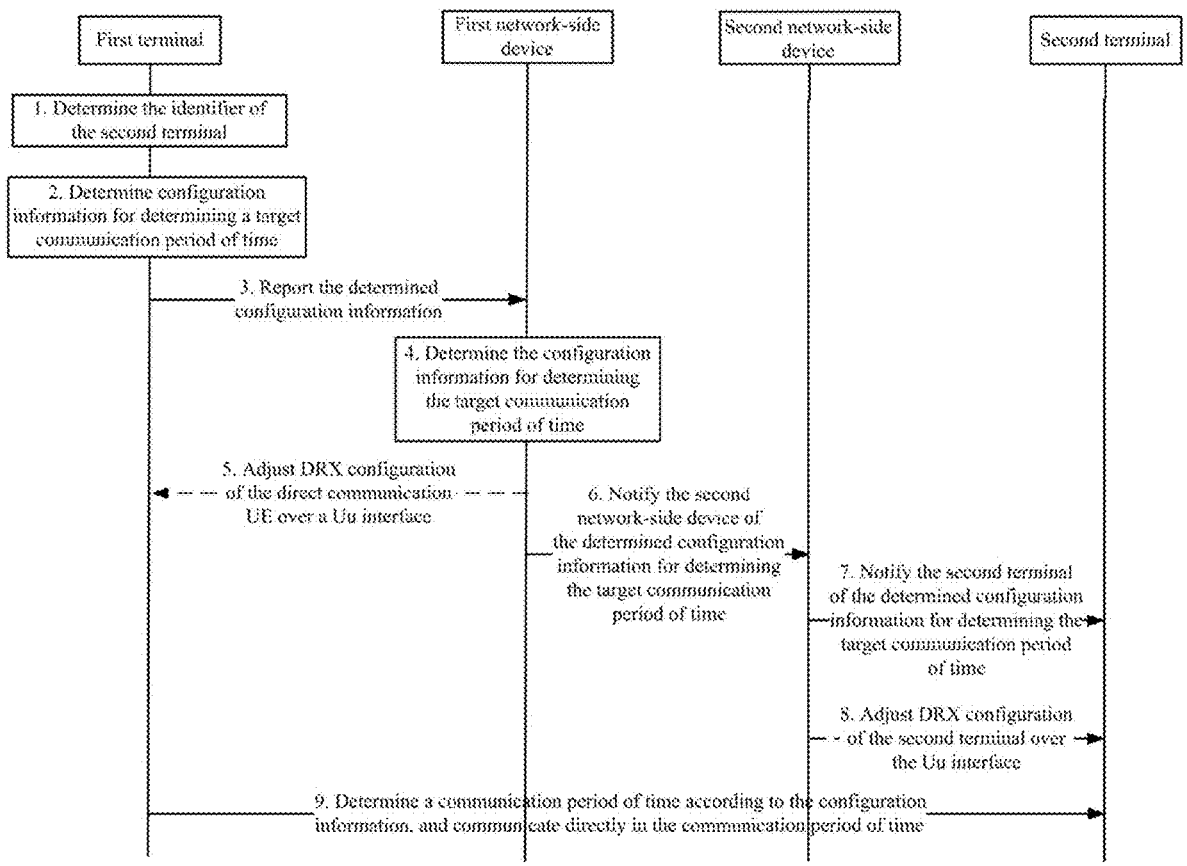
FIG. 15 is a schematic diagram of determining configuration information by a terminal according to an embodiment of the invention.

In a first embodiment, FIG. 15 illustrates a process of determining configuration information by a terminal according to an embodiment of the invention.

In the step 1, a first terminal determines identification information of an opposite end of direct communication (i.e., the identifier of a second terminal).

The identification information of the opposite end of direct communication is determined as follows:

the identification information of the opposite end of direct communication is obtained in a direct communication uni-cast connection setup procedure, that is, the second terminal notifies the first terminal of the identification information thereof in the direct communication uni-cast connection setup procedure.

The identification information includes identification information of a direct communication interface (e.g., an L2 ID), and identification information of a Uu interface. Identification information of the direct communication destination terminal over a Uu interface can include identification information of the terminal over the Uu interface, and cell identification information.

The identification information of the terminal can be information which can identify a terminal uniquely in a cell, e.g., a C-RNTI, an SPS C-RNTI, etc.

The cell identification information can be identification information which can identify the terminal uniquely in a cell, e.g., an ECGI, etc.

In the step 2, the first terminal determines configuration information for determining a target communication period of time, where the target communication period of time is a period of time in which direct communication interface transmission and/or reception can be performed via a direct communication interface.

The first terminal can determine the configuration information according to one or a combination of the following information:

a traffic type of direct communication;

a traffic characteristic of direct communication (e.g., an interval of time at which traffic arrives);

SPS configuration of the first terminal and/or the second terminal (e.g., an SPS configuration periodicity); and DRX and/or DTX configuration information for the first terminal and/or the second terminal over a Uu interface.

Optionally, the first terminal can determine the configuration information so that the configuration information matches as much as possible with configuration information for the first terminal to determine a communication period of time over the Uu interface, for example, is aligned with DRX onduration. Of course, the configuration information can alternatively be determined according to configuration information for the first terminal to determine a communication period of time over the Uu interface, and configuration information for the second terminal to determine a communication period of time over the Uu interface (for example, notified by a serving base station of the second terminal to a first network-side device, and then notified by the first network-side device to the first terminal).

In the step 3, the first terminal transmits the determined configuration information to an accessed first network-side device.

Identification information of the Uu interface of the first terminal and/or the second terminal can be further carried, or identification information of the first terminal and/or the second terminal (e.g., L2 identification information) can be further carried, while the configuration information is being transmitted.

In the step 4, the first network-side device determines the configuration information for determining the target communication period of time.

The first network-side device determines the configuration information reported by the first terminal as the configuration information for determining the target communication period of time.

In the step 5, the first network-side device determines a resource for direct communication, and/or modifies DRX and/or DTX configuration of the first terminal over a Uu interface, according to the configuration information, and notifies the first terminal of adjusted configuration information of the Uu interface (this step will be performed if the configuration information of the Uu interface is adjusted).

In the step 6, the first network-side device notifies a second network-side device accessed by the second terminal of the determined configuration information.

Optionally, the first network-side device can carry identification information of the first terminal and/or the second terminal over a Uu interface, or can carry identification information of the first terminal and/or the second terminal over the direct communication interface, e.g., L2 IDs, in the notification message.

If the first terminal and the second terminal are homed to the same network-side device, then this step may be skipped.

In the step 7, the second network-side device notifies the second terminal of the received configuration information.

In an implementation, the second network-side device can notify the second terminal of the received configuration information via Radio Resource Control (RRC) signaling or Media Access Control (MAC) signaling or physical layer signaling.

Optionally, the second network-side device can further carry identification information of the first terminal over a direct communication interface, e.g., an L2 ID.

The configuration information includes a part or all of the following information:

onDurationTimer; drx-InactivityTimer; drx-RetransmissionTimer; LongDRX-CycleStartOffset; LongDTX-CycleStartOffset; ShortDRX-Cycle; ShortDTX-Cycle; DrxShortCycleTimer; and DtxShortCycleTimer.

Optionally, only onDurationTimer may be applied. Any one of the other information can be applied with onDurationTimer.

In the step 8, the second network-side device determines a resource for direct communication, and/or modifies DRX and/or DTX configuration of the second terminal over a Uu interface, according to the configuration information, and notifies the second terminal of adjusted configuration information of the Uu interface (this step will be performed if the configuration information of the Uu interface is adjusted).

In the step 9, the first terminal and the second terminal determine the target communication period of time over a direct communication interface according to the configuration information, and communicate directly with each other.

Optionally, a DTX and/or DTX timer maintenance procedure in communication can be performed in the same way as a DRX timer maintenance procedure in the 3GPP TS 36.321.

In an implementation, the directly transmitting terminal selects a transmit resource from active resources according to the configuration information, and the directly receiving terminal selects a receive resource from the active resources according to the configuration information.

If there is D2D broadcast communication, then differences from the flow above will generally lie in the following steps.

In the step 1, if there is broadcast communication, then the identifier of the second terminal will be different from that in uni-cast communication, and broadcast communication may be identified using one bit, or the identifier of the second terminal may be omitted.

In the step 3, an L2 group ID instead of an L2 group ID shall be carried as identification information.

In the step 4, since there are a plurality of second terminals, second network-side devices are all the second network-side device base stations adjacent to the first network-side device.

In the step 6 or 7, the carried identification information is different from that in uni-cast communication, and the identifier may be broadcasted using one bit, or may be omitted.

The step 8 may be skipped.

Figure 16:
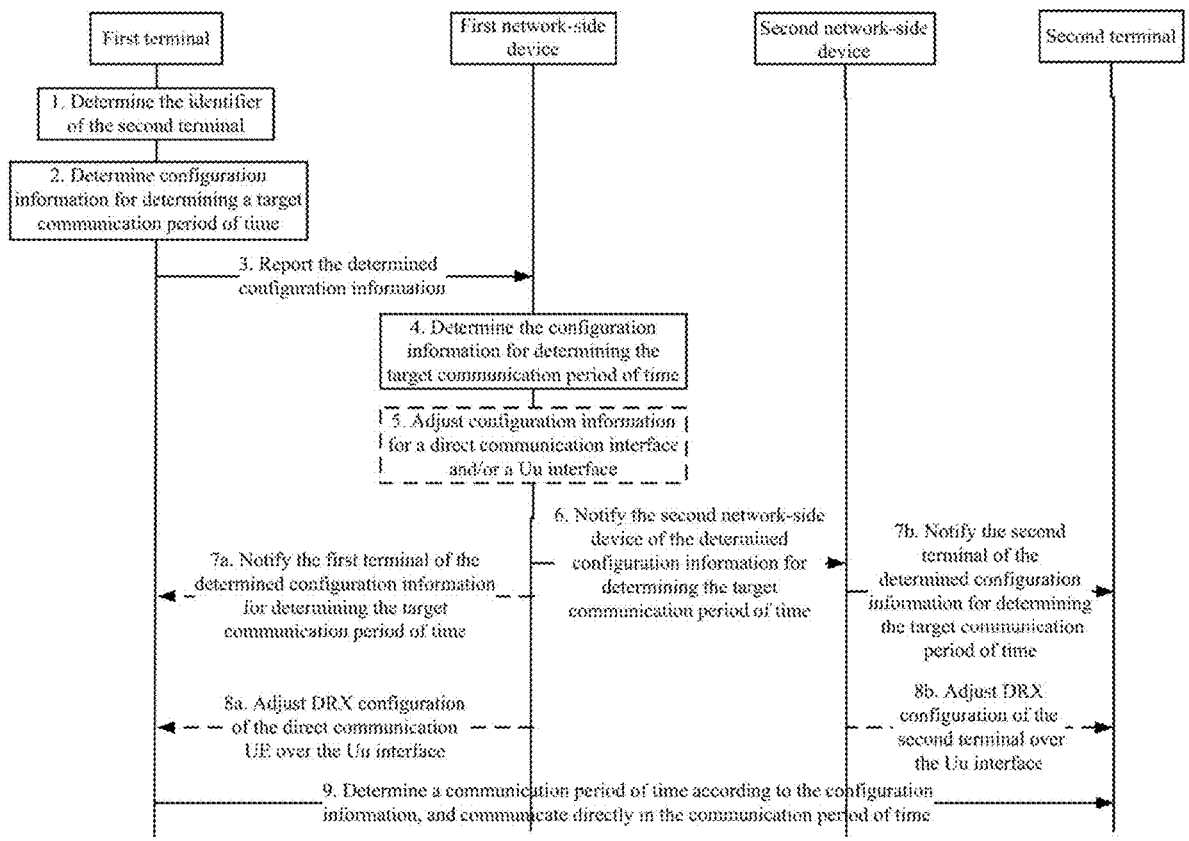
FIG. 16 is a schematic diagram of determining configuration information by a network-side device under the assistance of a terminal according to an embodiment of the invention.

In a second embodiment, FIG. 16 illustrates a process of determining configuration information by a network-side device under the assistance of a terminal according to an embodiment of the invention.

In the step 1, a first terminal determines identification information of an opposite end of direct communication (i.e., the identifier of a second terminal).

The identification information of the opposite end of direct communication is determined as follows:

the identification information of the opposite end of direct communication is obtained in a direct communication uni-cast connection setup procedure, that is, the second terminal notifies the first terminal of the identification information thereof in the direct communication uni-cast connection setup procedure.

The identification information includes identification information of a direct communication interface (e.g., an L2 ID), and identification information of a Uu interface. Identification information of the direct communication destination terminal over a Uu interface can include identification information of the terminal over the Uu interface, and cell identification information.

The identification information of the terminal can be information which can identify a terminal uniquely in a cell, e.g., a C-RNTI, an SPS C-RNTI, etc.

The cell identification information can be identification information which can identify the terminal uniquely in a cell, e.g., an ECGI, etc.

In the step 2, the first terminal determines desirable configuration information for determining a target communication period of time, where the target communication period of time is a period of time in which direct communication interface transmission and/or reception can be performed via a direct communication interface.

The first terminal can determine the configuration information according to one or a combination of the following information:

a traffic type of direct communication;

a traffic characteristic of direct communication (e.g., an interval of time at which traffic arrives);

SPS configuration of the first terminal and/or the second terminal (e.g., an SPS configuration periodicity); and DRX and/or DTX configuration information for the first terminal and/or the second terminal over a Uu interface.

Optionally, the first terminal can determine the configuration information so that the configuration information matches as much as possible with configuration information for the first terminal to determine a communication period of time over the Uu interface, for example, is aligned with DRX onduration. Of course, the configuration information can alternatively be determined according to configuration information for the first terminal to determine a communication period of time over the Uu interface, and configuration information for the second terminal to determine a communication period of time over the Uu interface (for example, notified by a serving base station of the second terminal to a first network-side device, and then notified by the first network-side device to the first terminal).

In the step 3, the first terminal transmits the determined configuration information to an accessed first network-side device.

Identification information of the Uu interface of the first terminal and/or the second terminal can be further carried, or identification information of the first terminal and/or the second terminal (e.g., L2 identification information) can be further carried, while the configuration information is being transmitted.

In the step 4, the first network-side device determines the configuration information for determining the target communication period of time.

The first network-side device determines configuration information to be transmitted, as the desirable configuration information reported by the first terminal.

In the step 5, the first network-side device determines a resource for direct communication, and/or modifies DRX and/or DTX configuration of the first terminal over a Uu interface, according to the configuration information.

Optionally, the first network-side device can add a part or all of the current resource occupancy condition, configuration information for the first terminal to determine a communication period of time over a Uu interface, a service characteristic of the first terminal, and other factors in addition to the configuration information desirable to the first terminal; or the first network-side device can determine the received desirable configuration information directly as resulting configuration information, and adjust configuration information for the first terminal to determine a communication period of time over the Uu interface.

Of course, it can alternatively be determined according to configuration information for the first terminal to determine a communication period of time over a Uu interface, and configuration information for the second terminal to determine a communication period of time over the Uu interface (for example, notified by a serving base station of the second terminal to a serving base station of the first terminal, and then notified by the serving base station of the first terminal to the first terminal).

In the step 6, the first network-side device notifies a second network-side device accessed by the second terminal of the determined configuration information.

Optionally, the first network-side device can carry identification information of the first terminal and/or the second terminal over a Uu interface, or can carry identification information of the first terminal and/or the second terminal over the direct communication interface, e.g., L2 IDs, in the notification message.

If the first terminal and the second terminal are homed to the same network-side device, then this step may be skipped.

In the step 7a, the first network-side device notifies the first terminal of the received configuration information.

In an implementation, the first network-side device can notify the first terminal of the received configuration information via RRC signaling or MAC signaling or physical layer signaling.

Optionally, the first network-side device can further carry identification information of the second terminal over a direct communication interface, e.g., an L2 ID.

In the step 7b, the second network-side device notifies the second terminal of the received configuration information.

In an implementation, the second network-side device can notify the second terminal of the received configuration information via RRC signaling or MAC signaling or physical layer signaling.

Optionally, the second network-side device can further carry identification information of the first terminal over the direct communication interface, e.g., an L2 ID.

Here, there is no required timing relationship between the step 7a and the step 7b, but they can be performed concurrently, or can be performed separately.

The configuration information includes a part or all of the following information:

onDurationTimer; drx-InactivityTimer; drx-RetransmissionTimer; LongDRX-CycleStartOffset; LongDTX-CycleStartOffset; ShortDRX-Cycle; ShortDTX-Cycle; DrxShortCycleTimer; and DtxShortCycleTimer.

Optionally, only onDurationTimer may be applied. Any one of the other information can be applied with onDurationTimer.

In the step 8a, the first network-side device notifies the first terminal of adjusted configuration information of the Uu interface (this step will be performed if the configuration information of the Uu interface is adjusted).

In the step 8b, the second network-side device determines a resource for direct communication, and/or modifies DRX and/or DTX configuration of the second terminal over a Uu interface, according to the configuration information, and notifies the second terminal of adjusted configuration information of the Uu interface (this step will be performed if the configuration information of the Uu interface is adjusted).

Here, there is no required timing relationship between the step 8a and the step 8b, but they can be performed concurrently, or can be performed separately.

In the step 9, the first terminal and the second terminal determine the target communication period of time over a direct communication interface according to the configuration information, and communicate directly with each other.

Optionally, a DTX and/or DTX timer maintenance procedure in communication can be performed in the same way as a DRX timer maintenance procedure in the 3GPP TS 36.321.

In an implementation, the directly transmitting terminal selects a transmit resource from active resources according to the configuration information, and the directly receiving terminal selects a receive resource from the active resources according to the configuration information.

If there is D2D broadcast communication, then differences from the flow above will generally lie in the following steps.

In the step 1, if there is broadcast communication, then the identifier of the second terminal will be different from that in uni-cast communication, and broadcast communication may be identified using one bit, or the identifier of the second terminal may be omitted.

In the step 3, an L2 group ID instead of an L2 group ID shall be carried as identification information.

In the step 4, since there are a plurality of second terminals, second network-side devices are all the second network-side device base stations adjacent to the first network-side device.

In the step 7b, the configuration information is broadcasted.

The step 8a/8b may be skipped.

Figure 17:
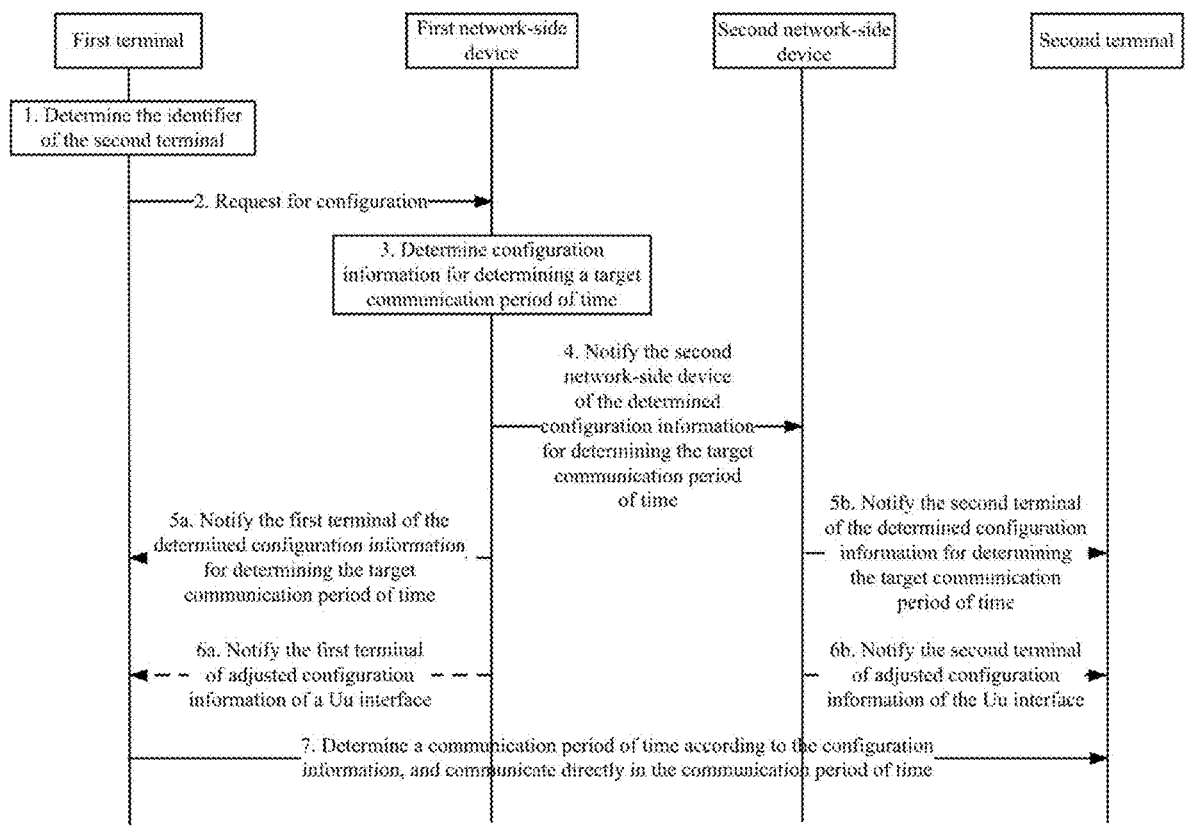
FIG. 17 is a schematic diagram of determining configuration information by a network-side device according to an embodiment of the invention.

In a third embodiment, FIG. 17 illustrates a process of determining configuration information by a network-side device according to an embodiment of the invention.

In the step 1, a first terminal determines identification information of an opposite end of direct communication (i.e., the identifier of a second terminal).

The identification information of the opposite end of direct communication is determined as follows:

the identification information of the opposite end of direct communication is obtained in a direct communication uni-cast connection setup procedure, that is, the second terminal notifies the first terminal of the identification information thereof in the direct communication uni-cast connection setup procedure.

The identification information includes identification information of a direct communication interface (e.g., an L2 ID), and identification information of a Uu interface. Identification information of the direct communication destination terminal over a Uu interface can include identification information of the terminal over the Uu interface, and cell identification information.

The identification information of the terminal can be information which can identify a terminal uniquely in a cell, e.g., a C-RNTI, an SPS C-RNTI, etc.

The cell identification information can be identification information which can identify the terminal uniquely in a cell, e.g., an ECGI, etc.

In the step 2, the first terminal requests a first network-side device to configure.

Optionally, the first terminal transmitting the request can further carry other assistance information, which can particularly be one or a combination of:

a traffic type of direct communication;

a traffic characteristic of direct communication (e.g., an interval of time at which traffic arrives);

SPS configuration of the first terminal and/or the second terminal (e.g., an SPS configuration periodicity); and DRX and/or DTX configuration information for the first terminal and/or the second terminal over a Uu interface.

In the step 3, the first network-side device determines configuration information for determining a target communication period of time.

Particularly, there are the following two alternatives.

In a first alternative, the first network-side device determines the configuration information for determining the target communication period of time.

In a second alternative, the first network-side device and a second network-side device negotiate about the configuration information for determining the target communication period of time.

In the second alternative, some assistance information can be exchanged between the first network-side device and the second network-side device, e.g., identification information of the first terminal and/or the second terminal, the current configuration information for the first terminal and/or the second terminal to determine a communication period of time over the Uu interface.

In either of the alternatives above, the configuration information for determining the target communication period of time can be determined so that the configuration information matches as much as possible with the configuration information for the first terminal and/or the second terminal to determine a communication period of time over the Uu interface, for example, is aligned with DRX onduration.

Of course, the configuration information can alternatively be determined according to the configuration information for the first terminal to determine a communication period of time over the Uu interface, and the configuration information for the second terminal to determine a communication period of time over the Uu interface (for example, notified by a serving base station of the second terminal to a serving base station of the first terminal, and then notified by the serving base station of the first terminal to the first terminal).

In the step 4, the first network-side device notifies a second network-side device accessed by the second terminal of the determined configuration information.

Optionally, the first network-side device can carry identification information of the first terminal and/or the second terminal over the Uu interface, or can carry identification information of the first terminal and/or the second terminal over the direct communication interface, e.g., L2 IDs, in the notification message.

If the first terminal and the second terminal are homed to the same network-side device, then this step may be skipped.

In the step 5a, the first network-side device notifies the first terminal of the received configuration information.

In an implementation, the first network-side device can notify the first terminal of the received configuration information via RRC signaling or MAC signaling or physical layer signaling.

Optionally, the first network-side device can further carry identification information of the second terminal over the direct communication interface, e.g., an L2 ID.

In the step 5b, the second network-side device notifies the second terminal of the received configuration information.

In an implementation, the second network-side device can notify the second terminal of the received configuration information via RRC signaling or MAC signaling or physical layer signaling.

Optionally, the second network-side device can further carry identification information of the first terminal over the direct communication interface, e.g., an L2 ID.

The configuration information includes a part or all of the following information:

onDurationTimer; drx-InactivityTimer; drx-RetransmissionTimer; LongDRX-CycleStartOffset; LongDTX-CycleStartOffset; ShortDRX-Cycle; ShortDTX-Cycle; DrxShortCycleTimer; and DtxShortCycleTimer.

Optionally, only onDurationTimer may be applied. Any one of the other information can be applied with onDurationTimer.

Here, there is no required timing relationship between the step 5a and the step 5b, but they can be performed concurrently, or can be performed separately.

In the step 6a, the first network-side device notifies the first terminal of adjusted configuration information of the Uu interface (this step will be performed if the configuration information of the Uu interface is adjusted).

In the step 6b, the second network-side device notifies the second terminal of adjusted configuration information of the Uu interface (this step will be performed if the configuration information of the Uu interface is adjusted).

Here, there is no required timing relationship between the step 6a and the step 6b, but they can be performed concurrently, or can be performed separately.

In the step 7, the first terminal and the second terminal determine the target communication period of time over a direct communication interface according to the configuration information, and communicate directly with each other.

Optionally, a DTX and/or DTX timer maintenance procedure in communication can be performed in the same way as a DRX timer maintenance procedure in the 3GPP TS 36.321.

In an implementation, the directly transmitting terminal selects a transmit resource from active resources according to the configuration information, and the directly receiving terminal selects a receive resource from the active resources according to the configuration information.

If there is D2D broadcast communication, then differences from the flow above will generally lie in the following steps.

In the step 1, if there is broadcast communication, then the identifier of the second terminal will be different from that in uni-cast communication, and broadcast communication may be identified using one bit, or the identifier of the second terminal may be omitted.

In the step 2, an L2 group ID instead of an L2 group ID shall be carried as identification information.

In the step 3, since there are a plurality of second terminals, second network-side devices are all the second network-side device base stations adjacent to the first network-side device.

In the step 4, the carried identification information of the direct communication opposite UE is different from that in uni-cast communication, and the identifier may be broadcasted using one bit, or may be omitted.

In the step 5b, the configuration information is broadcasted.

The step 6a/6b may be skipped.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a processor of a general-purpose computer or a specific-purpose computer, and/or another programmable data processing device to produce a machine so that the instructions executed on the processor of the computer, and/or the other programmable data processing device create means for performing the functions/actions specified in the flow(s) of the flow chart and/or the block(s) of the block diagram.

Correspondingly the invention can be further embodied in hardware and/or software (including firmware, resident software, micro-codes, etc.). Still furthermore the invention can be embodied in the form of a computer program product on a computer useable or readable storage medium, where the computer program product includes computer useable or readable program codes embodied in the medium to be used by or in connection with an instruction executing system. In the context of the invention, the computer useable or readable medium can be any medium which can include, store, communicate, transmit, or transport program to be used by or in connection with an instruction executing system, apparatus or device.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for configuring communication, the method comprising:
   instructing, by a first terminal, a first network-side device to configure a second terminal to communicate according to a configuration information for D2D link DRX; and
   determining, by the first terminal, a target communication period of time according to the configuration information for D2D link DRX;
   wherein the target communication period of time is a period of time in which direct communication interface transmission and/or reception can be performed via a direct communication interface.

2. The method according to claim 1, wherein determining, by the first terminal, the configuration information for determining the target communication period of time comprises:
   determining, by the first terminal, the configuration information according to a part or all of following parameters:
   a traffic type of direct communication;
   a traffic characteristic of direct communication;
   Semi-Persistent Scheduling (SPS) configuration of the first terminal and/or the second terminal; and
   Discontinuous Reception (DRX) and/or Discontinuous Transmission (DTX) configuration information for the first terminal and/or the second terminal over a Uu interface.

3. The method according to claim 1, wherein before the first terminal determines the configuration information, the method further comprises:
   obtaining, by the first terminal, identification information of a Uu interface of the second terminal via the direct communication interface; and/or
   obtaining, by the first terminal, DRX and/or DTX configuration of a Uu interface of the second terminal via the direct communication interface.

4. The method according to claim 3, wherein transmitting, by the first terminal, the configuration information to the first network-side device further comprises:
   notifying, by the first terminal, the first network-side device of identification information of a Uu interface of the second terminal, and the configuration information.

5. The method according to claim 3, wherein the identification information of the Uu interface of the second terminal comprises a UE identifier and a cell identifier.

6. The method according to claim 5, wherein the UE identifier is a Cell-Radio Network Temporary Identifier (C-RNTI) or an SPS C-RNTI; and
   the cell identifier is an Evolved Universal Mobile Telecommunication System (UMTS) Terrestrial Radio Access network (EUTRAN) Cell Global Identifier (ECGI).

7. The method according to claim 1, wherein transmitting, by the first terminal, the configuration information to the first network-side device further comprises:
   notifying, by the first terminal, the first network-side device of an identifier of the direct communication interface of the first terminal, an identifier of the direct communication interface of the second terminal, and the configuration information.

8. The method according to claim 7, wherein there is a uni-cast communication between the first terminal and the second terminal, and the identifier of the direct communication interface of the first terminal, and the identifier of the direct communication interface of the second terminal are layer-2 identifiers of the direct communication interface; or
there is a broadcast communication between the first terminal and the second terminal, and the identifier of the direct communication interface of the first terminal, and the identifier of the direct communication interface of the second terminal are a layer-2 group identifier of the direct communication interface.

9. The method according to claim 1, wherein instructing, by the first terminal, the first network-side device to configure the second terminal to communicate comprises:
determining, by the first terminal, the configuration information, and transmitting the configuration information to the first network-side device, so that the first network-side device transmits the configuration information to the second terminal; or
transmitting, by the first terminal, a desirable configuration information to the first network-side device, so that the first network-side device determines the configuration information to be transmitted to the first terminal and the second terminal, according to received desirable configuration information.

10. The method according to claim 1, wherein the configuration information comprises a part or all of following information:
onDurationTimer;
drx-InactivityTimer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

11. A method for configuring communication, the method comprising:
receiving, by a second terminal, a configuration information for D2D link DRX for determining a target communication period of time from a network-side device, wherein the target communication period of time is a period of time in which direct communication interface transmission and/or reception can be performed via a direct communication interface; and
determining, by the second terminal, the target communication period of time according to the configuration information.

12. A method for configuring communication, the method comprising:
determining, by a first network-side device, a configuration information for D2D link DRX for determining a target communication period of time, upon reception of an instruction transmitted by a first terminal to configure a second terminal to communicate, wherein the target communication period of time is a period of time in which direct communication interface transmission and/or reception can be performed via a direct communication interface; and
transmitting, by the first network-side device, the configuration information to the second terminal, so that the second terminal determines the target communication period of time according to the configuration information.

13. The method according to claim 12, wherein determining, by the first network-side device, the configuration information for determining the target communication period of time comprises:
determining, by the first network-side device, the configuration information according to a part or all of following parameters:
a traffic type of direct communication;
a traffic characteristic of direct communication;
SPS configuration of the first terminal and/or the second terminal; and
DRX and/or DTX configuration information for the first terminal and/or the second terminal over a Uu interface;
wherein after the first network-side device determines the configuration information for determining the target communication period of time, the method further comprises:
transmitting, by the first network-side device, the configuration information to the first terminal.

14. The method according to claim 13, wherein if the parameters for determining the configuration information comprise DRX and/or DTX configuration information of the second terminal over a Uu interface, and the second terminal does not access the first network-side device, then before the first network-side device determines the configuration information for determining the target communication period of time, the method further comprises:
obtaining, by the first network-side device, DTX and/or DRX configuration of a current Uu interface of the second terminal from a second network-side device accessed by the second terminal via an inter-eNB interface; or
obtaining, by the first network-side device, DTX and/or DRX configuration of a current Uu interface of the second terminal from the first terminal via the Uu interface.

15. The method according to claim 12, wherein determining, by the first network-side device, the configuration information for determining the target communication period of time comprises:
if the instruction to configure the second terminal to communicate comprises configuration information, for determining the target communication period of time, desirable to the first terminal, then determining, by the first network-side device, the configuration information to be transmitted, according to received desirable configuration information, for determining the target communication period of time, desirable to the first terminal; or
if the instruction to configure the second terminal to communicate comprises the configuration information, for determining the target communication period of time, determined by the first terminal, then determining, by the first network-side device, the received configuration information, for determining the target communication period of time, determined by the first terminal as the configuration information to be transmitted;
wherein the first network-side determines the configuration information to be transmitted, according to received desirable configuration information, for determining the target communication period of time, desirable to the first terminal; and
after the first network-side device determines the configuration information for determining the target communication period of time, the method further comprises:
transmitting, by the first network-side device, the configuration information to the first terminal.

16. The method according to claim 12, wherein the first network-side transmits identification information of a Uu interface, and the configuration information;

wherein the identification information of the Uu interface of the second terminal comprises a UE identifier and a cell identifier;

wherein the UE identifier is a C-RNTI or an SPS C-RNTI; and the cell identifier is an ECGI.

17. The method according to claim 12, wherein the first network-side transmits an identifier of the direct communication interface of the first terminal, an identifier of the direct communication interface of the second terminal, and the configuration information;

wherein there is a uni-cast communication between the first terminal and the second terminal, and the identifier of the direct communication interface of the first terminal, and the identifier of the direct communication interface of the second terminal are layer-2 identifiers of the direct communication interface; or there is a broadcast communication between the first terminal and the second terminal, and the identifier of the direct communication interface of the first terminal, and the identifier of the direct communication interface of the second terminal are a layer-2 group identifier of the direct communication interface.

18. The method according to claim 12, wherein after the first network-side device determines the configuration information for determining the target communication period of time, the method further comprises:

the first network-side determines a resource for direct communication according to the configuration information; and/or the first network-side modifies DRX and/or DTX configuration of the first terminal over a Uu interface according to the configuration information.

19. The method according to claim 12, wherein transmitting, by the first network-side, the configuration information to the second terminal comprises:

if the second terminal does not access the first network-side device, then transmitting, by the first network-side, the configuration information to the second terminal through a second network-side device accessed by the second terminal.

* * * * *